US009996258B2

(12) United States Patent
Bi

(10) Patent No.: US 9,996,258 B2
(45) Date of Patent: Jun. 12, 2018

(54) SUGGESTION SELECTION DURING CONTINUOUS GESTURE INPUT

(71) Applicant: Google Inc., Mountain View, CA (US)

(72) Inventor: Xiaojun Bi, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 651 days.

(21) Appl. No.: 14/656,680

(22) Filed: Mar. 12, 2015

(65) Prior Publication Data

US 2016/0266790 A1   Sep. 15, 2016

(51) Int. Cl.
*G06F 3/00* (2006.01)
*G06F 3/0488* (2013.01)
*G06F 3/0489* (2013.01)
*G06F 17/27* (2006.01)
*G06F 3/023* (2006.01)

(52) U.S. Cl.
CPC ........ *G06F 3/04886* (2013.01); *G06F 3/0237* (2013.01); *G06F 3/0489* (2013.01); *G06F 17/276* (2013.01); *G06F 3/0488* (2013.01); *G06F 3/04883* (2013.01)

(58) Field of Classification Search
CPC ............... G06F 3/0488; G06F 3/04883; G06F 3/04886; G06F 3/0489
See application file for complete search history.

(56) References Cited

U.S. PATENT DOCUMENTS

2008/0270896 A1    10/2008 Kristensson et al.
2013/0021286 A1 *   1/2013 Sudo ........................ G06F 3/018
                                                                345/173
2014/0237411 A1 *   8/2014 Pasquero ............ G06F 3/04886
                                                                715/773
2014/0359515 A1 *  12/2014 Medlock ............... G06F 3/0237
                                                                715/773
2014/0365878 A1 *  12/2014 Dai ...................... G06F 3/04883
                                                                715/256

(Continued)

OTHER PUBLICATIONS

"Cancel a word mid-swype," Swype Forums, retrieved on Jul. 30, 2014 from http://forum.swype.com/archive/index.php/t-338.html, 2 pp.

(Continued)

*Primary Examiner* — Kieu Vu
*Assistant Examiner* — Andrew Chung
(74) *Attorney, Agent, or Firm* — Shumaker & Sieffert, P.A.

(57) ABSTRACT

A computing device includes at least one processor and at least one module operable by the at least one processor to output, for display, a graphical keyboard comprising a plurality of keys, receive an indication of a first gesture portion, and determine, based on the first gesture portion, at least one candidate string. The at least one module may be further operable to output, for display at a first location of a display device, the at least one candidate string, receive an indication of a second gesture portion that traverses a location that corresponds to the at least one candidate string, wherein the first gesture portion and the second gesture portion are included in a single continuous gesture, select, based on the second gesture portion, the at least one candidate string, and output, for display at a second location of the display device, the at least one candidate string.

17 Claims, 8 Drawing Sheets

(56) References Cited

U.S. PATENT DOCUMENTS

| | | | | |
|---|---|---|---|---|
| 2015/0277751 A1* | 10/2015 | Manmualiya | ....... | G06F 3/04883 |
| | | | | 715/773 |
| 2015/0347007 A1* | 12/2015 | Chaudhri | ............ | G06F 3/04842 |
| | | | | 715/773 |
| 2016/0077734 A1* | 3/2016 | Buxton | ............... | G06F 3/04842 |
| | | | | 715/773 |
| 2016/0253299 A1* | 9/2016 | Mese | ...................... | G06F 17/24 |
| | | | | 715/271 |

OTHER PUBLICATIONS

"Capital letters in the middle of words," Swpe Forums, retrieved on Jul. 30, 2014 from http://forum.swype.com/showthread.php?11983-Capital-letters-in-the-middle-of-words, 4 pp.

"SwiftKey Keyboard- faster, easier & more accurate typing," SwiftKey Keyboard, retrieved on Jul. 30, 2014 from http://swiftkey.com/en/keyboard, 6 pp.

"Advanced Tips," Swype, retrieved on Jul. 30, 2014 from http://www.swype.com/tips/advanced-tips/, 2 pp.

Response to Communication Pursuant to Rules 161(1) and 162 EPC dated Aug. 24, 2017, from counterpart European Application No. 16705412.1, filed Mar. 1, 2018, 7 pp.

Communication Pursuant to Rules 161(1) and 162 EPC dated Aug. 24, 2017, from counterpart European Application No. 16705412.1, 2 pp.

International Preliminary Report on Patentability from International Application No. PCTUS2016/016575, dated Sep. 21, 2017, 7 pp.

\* cited by examiner

SUGGESTION SELECTION DURING CONTINUOUS GESTURE INPUT

BACKGROUND

Some computing devices provide a graphical keyboard as part of a user interface for text entry. For instance, a presence-sensitive display included in or coupled to a computing device may output a graphical keyboard that enables a user to enter data by indicating keys displayed at the presence-sensitive display.

In some cases, the computing device may present a graphical keyboard with which a user can interact by tapping individual keys of the keyboard or by sliding a finger over successive regions associated with desired keys. In this way, graphical keyboards provide an input method that allows a user to enter characters, words, or groups of words by entry of one or more continuous gestures. As such, a graphical keyboard may allow a user to enter text into a computing device with a certain degree of accuracy and efficiency.

However, some graphical keyboards have certain drawbacks. For example, some graphical keyboards may not correctly determine character strings from performed gesture input. As such, some graphical keyboards may force a user to perform additional actions to correct erroneously interpreted input, thereby slowing down gesture input and reducing the efficiency of gesture-based text input.

SUMMARY

In one example a method includes outputting, by a computing device and for display at a display device that is operatively coupled to the computing device, a graphical keyboard comprising a plurality of keys, receiving, by the computing device, an indication of a first gesture portion detected at a presence-sensitive input device that is operatively coupled to the computing device, and determining, by the computing device and based at least in part on the first gesture portion, at least one candidate string. The method may further include outputting, by the computing device and for display at a first location of the display device, the at least one candidate string, receiving, by the computing device, an indication of a second gesture portion that traverses a location of the presence-sensitive input device that corresponds to the at least one candidate string, wherein the first gesture portion and the second gesture portion are included in a single continuous gesture, selecting, by the computing device and based at least in part on the second gesture portion, the at least one candidate string, and outputting, by the computing device and for display at a second location of the display device, the at least one candidate string.

In another example a computing device includes at least one processor and at least one module operable by the at least one processor to: output, for display at a display device that is operatively coupled to the computing device, a graphical keyboard comprising a plurality of keys, receive an indication of a first gesture portion detected at a presence-sensitive input device that is operatively coupled to the computing device, and determine, based at least in part on the first gesture portion, at least one candidate string. The at least one module may be further operable by the at least one processor to: output, for display at a first location of the display device, the at least one candidate string, receive an indication of a second gesture portion that traverses the first location, wherein the first gesture portion and the second gesture portion are included in a single continuous gesture, select, based at least in part on the second gesture portion, the at least one candidate string, and output, for display at a second location of the display device, the at least one candidate string.

In another example a computer-readable storage medium is encoded with instructions that, when executed, cause at least one processor to: output, for display at a display device that is operatively coupled to the computing device, a graphical keyboard comprising a plurality of keys, receive an indication of a first gesture portion detected at a presence-sensitive input device that is operatively coupled to the computing device, and determine, based at least in part on the first gesture portion, at least one candidate string. The computer-readable storage medium may be further encoded with instructions that, when executed, cause the at least one processor to: output, for display at a first location of the display device, the at least one candidate string, receive an indication of a second gesture portion that traverses a location of the presence-sensitive input device that corresponds to a non-character key of the graphical keyboard, wherein the first gesture portion and the second gesture portion are included in a single continuous gesture, and execute, based at least in part on the second gesture portion, an operation associated with the non-character key.

The details of one or more examples are set forth in the accompanying drawings and the description below. Other features, objects, and advantages will be apparent from the description and drawings, and from the claims.

DETAILED DESCRIPTION

Techniques of this disclosure are directed to selection of characters in a graphical keyboard through entry of a continuous gesture. More specifically, techniques of the disclosure may enable a user to select a word or phrase suggestion by altering and/or completing the continuous gesture during entry. In some embodiments, the word or phrase suggestion may be based on, for example, characters already indicated by an initial portion of the continuous gesture. In some embodiments, the word or phrase suggestion may be output for display before the continuous gesture has been completed by the user. Accordingly, this disclosure is directed to techniques that enable selection of an outputted word suggestion within a single, continuous gesture that previously traversed one or more characters to generate the word suggestion, without interrupting the flow of the continuous gesture. As such, techniques of the disclosure may enable a user to select characters of a graphical keyboard and, in the same continuous gesture, subsequently select a word based on the selected characters.

In one example, a computing device may output a graphical keyboard for display at a display device and receive one or more indications of a continuous gesture detected at a presence-sensitive input device (e.g., a presence-sensitive display) operatively coupled to the computing device. The indications of the continuous gesture may, in some instances, correspond to multiple, respective keys. As the continuous gesture is detected by the computing device, the computing device may output word and/or phrase suggestions (also referred to as "candidate strings") that each represent a possible interpretation and/or completion of the input inferred from a received portion of the continuous gesture. As the user continues the gesture, the computing device may receive additional indications of the continuous gesture input. Responsive to determining that a subsequent portion of the continuous gesture corresponds to a location at which the particular suggestion is displayed, the computing device may select the particular suggestion as indicated by the user. In this way, techniques of the disclosure may enable the user to perform a single, continuous gesture to both select one or more characters of a word and, subsequently, select the word itself from a set of one or more word suggestions output during entry of the continuous gesture.

Accordingly, a computing device that implements techniques of this disclosure may reduce or eliminate the need for the user to interrupt his or her continuous gesture to select a word suggestion. That is, the user may be able to enter a single continuous gesture to input text and select word suggestions without having to lift his or her finger or otherwise interrupt the continuous gesture. By enabling the user to use a continuous gesture to input text and select word suggestions, techniques described herein may improve efficiency and/or accuracy of text input.

Figure 1A:
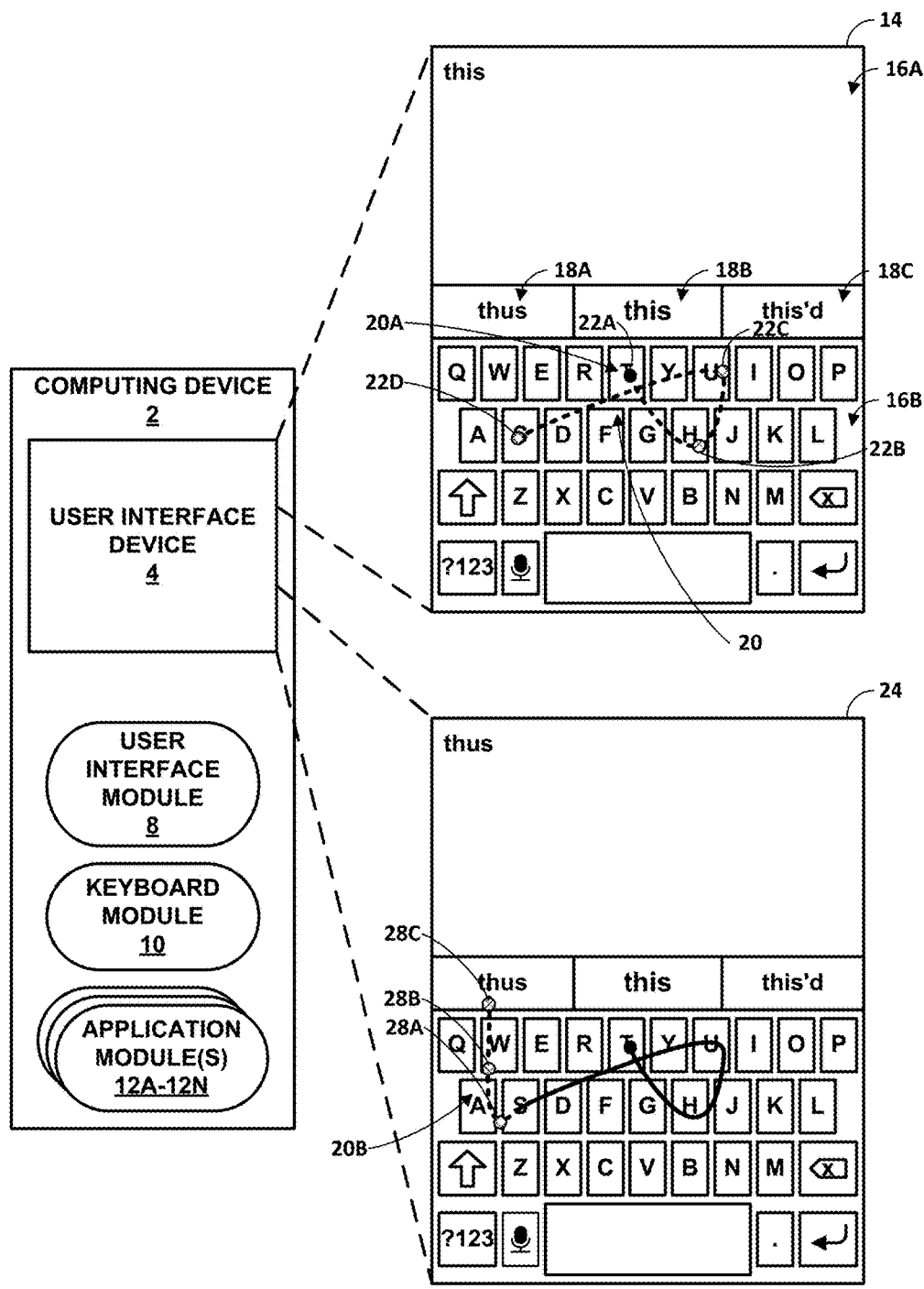
FIGS. 1A & 1B are block diagrams illustrating an example computing device and graphical user interfaces (GUIs) for enabling selection of suggestions during continuous gesture input, in accordance with one or more techniques of the present disclosure.
Figure 1B:
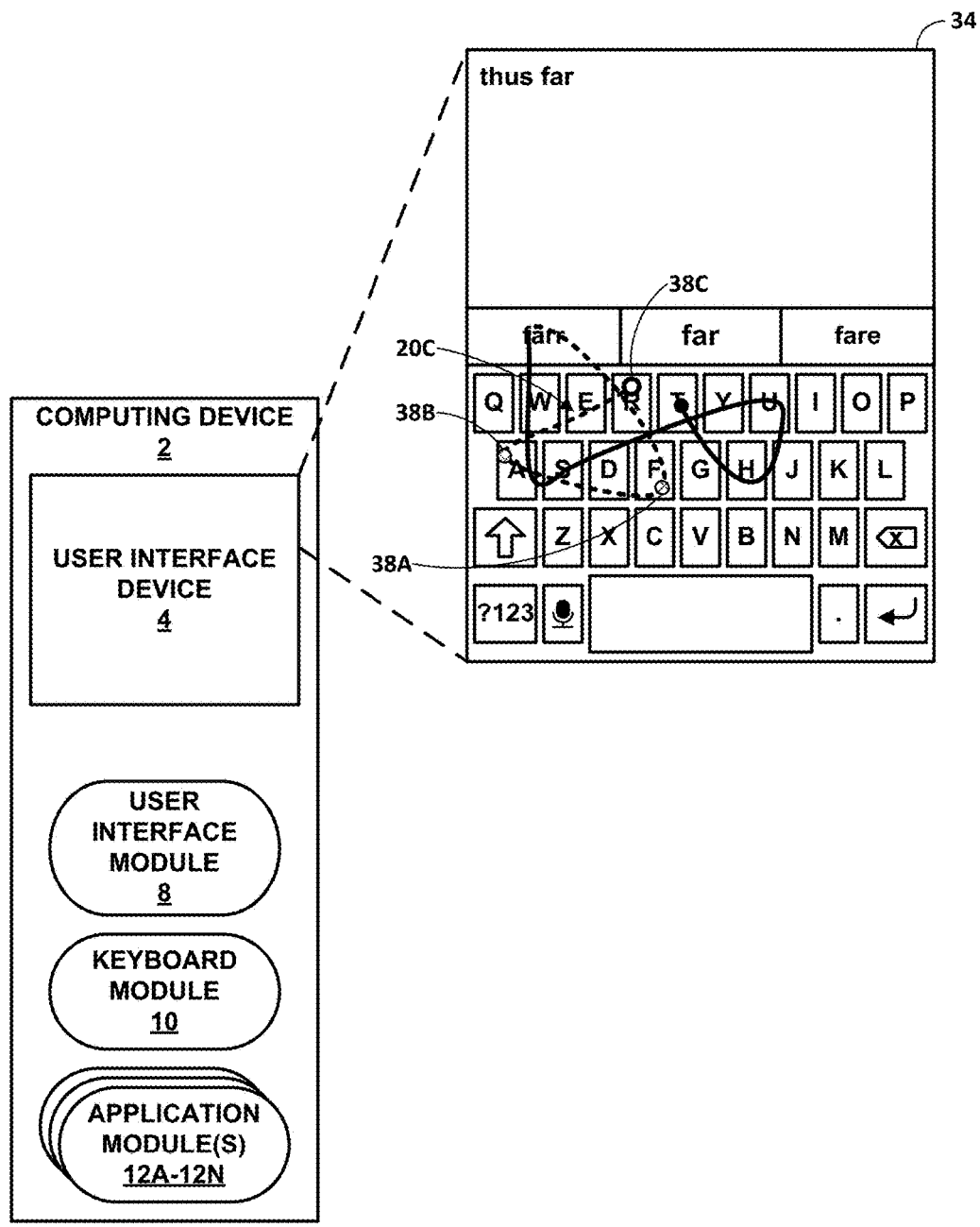

FIGS. 1A & 1B are block diagrams illustrating an example computing device 2 and graphical user interfaces (GUIs) 14, 24, and 34 for enabling selection of suggestions during continuous gesture input, in accordance with one or more techniques of the present disclosure. Examples of computing device 2 may include, but are not limited to, portable, mobile, or other devices, such as mobile phones (including smartphones), laptop computers, desktop computers, tablet computers, smart television platforms, personal digital assistants (PDAs), server computers, mainframes, and the like. For instance, in the example of FIGS. 1A, 1B, computing device 2 may be a smartphone.

Computing device 2, as shown in the example of FIGS. 1A, 1B, includes user interface (UI) device 4. UI device 4 may be configured to function as an input device and/or an output device for computing device 2. UI device 4 may be implemented using various technologies. For instance, UI device 4 may be configured to receive input from a user through tactile, audio, and/or video feedback. Examples of input devices include a presence-sensitive display, a presence-sensitive or touch-sensitive input device, a mouse, a keyboard, a voice responsive system, video camera, microphone or any other type of device for detecting a command from a user. In some examples, a presence-sensitive display includes a touch-sensitive or presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive technology. That is, UI device 4 may include a presence-sensitive device that may receive tactile input from a user of computing device 2. UI device 4 may receive indications of the tactile input by detecting one or more gestures from the user (e.g., when the user touches or points to one or more locations of UI device 4 with a finger or a stylus pen).

UI device 4 may additionally or alternatively be configured to function as an output device by providing output to a user using tactile, audio, or video stimuli. Examples of output devices include a sound card, a video graphics adapter card, or any of one or more display devices, such as a liquid crystal display (LCD), dot matrix display, light emitting diode (LED) display, organic light-emitting diode (OLED) display, e-ink, or similar monochrome or color display capable of outputting visible information to a user of computing device 2. Additional examples of an output device include a speaker, a cathode ray tube (CRT) monitor, a liquid crystal display (LCD), or other device that can generate intelligible output to a user. For instance, UI device 4 may present output to a user of computing device 2 as a graphical user interface that may be associated with functionality provided by computing device 2. In this way, UI device 4 may present various user interfaces of applications executing at or accessible by computing device 2 (e.g., an electronic message application, an Internet browser application, etc.). A user of computing device 2 may interact with a respective user interface of an application to cause computing device 2 to perform operations relating to a function.

In some examples, UI device 4 may detect two-dimensional and/or three-dimensional gestures as input from a user of computing device 2. For instance, a sensor of UI device 4 may detect the user's movement (e.g., moving a hand, an arm, a pen, a stylus, etc.) within a threshold distance of the sensor of UI device 4. UI device 4 may determine a two or three dimensional vector representation of the movement and correlate the vector representation to a gesture input (e.g., a hand-wave, a pinch, a clap, a pen stroke, etc.) that has multiple dimensions. In other words, UI device 4 may, in some examples, detect a multi-dimension gesture without requiring the user to gesture at or near a screen or surface at which UI device 4 outputs information for display. Instead, UI device 4 may detect a multi-dimensional gesture performed at or near a sensor which may or may not be located near the screen or surface at which UI device 4 outputs information for display.

As shown in the example of FIGS. 1A, 1B, computing device 2 includes user interface (UI) module 8, keyboard module 10 and application module(s) 12A-12N (collectively "application modules 12"). Modules 8, 10 and/or 12 may perform one or more operations described herein using hardware, software, firmware, or a mixture thereof residing within and/or executing at computing device 2. Computing device 2 may execute modules 8, 10, and/or 12 with one processor or with multiple processors. In some examples, computing device 2 may execute modules 8, 10, and/or 12 as a virtual machine executing on underlying hardware. Modules 8, 10, and/or 12 may execute as one or more services of an operating system or computing platform or may execute as one or more executable programs at an application layer of a computing platform.

UI module 8, in the example of FIGS. 1A, 1B, may be operable by computing device 2 to act as an intermediary between UI device 4 and the various other components of computing device 2. For instance, UI module 8 may make determinations based on input detected by UI device 4 and/or generate output for presentation by UI device 4 based on input received from one or more other components of computing device 2 (e.g., keyboard module 10 and/or application modules 12). As one example, UI module 8 may receive, as an input from keyboard module 10, a representation of keys included in a graphical keyboard to be presented as part of a GUI by UI device 4.

UI module 8 may additionally be operable by computing device 2 to receive, from UI device 4, one or more indications of user input detected at the presence-sensitive screen of UI device 4. Generally, each time UI device 4 receives an indication of user input detected at a location of the presence-sensitive screen, UI module 8 may receive, from UI device 4, information about the user input. UI module 8 may assemble the information received from UI device 4 into a time-ordered set of events (e.g., motion events) indicative of a gesture, such as a tap gesture, slide gesture, or other gesture. Each motion event may include data or components that represents parameters (e.g., when, where, originating direction, or other information) characterizing a presence and/or movement of input at the presence-sensitive screen. Each motion event in the sequence may include a location component corresponding to a location of UI device 4, a time component related to when UI device 4 detected user input at the location, and an action component related to the type of input received. For instance, the action component may indicate that the motion event corresponds to a lift up, a push down, or other action at the location. Moreover, one or more of the events may have a concurrent time component, and such events are described as motion events merely for purposes of example and may be indicative of a gesture at any form of presence-sensitive input device.

UI module 8 may determine one or more characteristics of the user input based on the sequence of motion events and include information about these one or more characteristics within each motion event in the sequence of motion events. For example, UI module 8 may determine a start location of the user input, an end location of the user input, a density of a portion of the user input, a speed of a portion of the user input, a direction of a portion of the user input, and/or a curvature of a portion of the user input. One or more motion events in the sequence of motion events may include (in addition to a time, a location, and an action component as described above) a characteristic component that includes information about one or more characteristics of the user input (e.g., a density, a speed, etc.). UI module 8 may transmit, as output to one or more other components of computing device 2, the sequence of motion events including the components or parameterized data associated with each motion event.

In the example of FIGS. 1A, 1B, UI module 8 may receive information about user input detected by UI device 4. UI module 8 may output, to keyboard module 10, a sequence of motion events generated based on the received information. Keyboard module 10 may determine, based on the location components in the sequence of motion events, that one or more location components approximate a selection of one or more of the displayed keys (e.g., keyboard module 10 may determine the location of one or more of the motion events corresponds to an area of UI device 4 that presents the keys of the graphical keyboard). In response, UI module 8 may receive, from keyboard module 10, one or more suggested character strings. UI module 8 may update the GUI to include the one or more character strings. UI module 8 may cause UI device 4 to present the updated GUI.

Application modules 12, in the example of FIGS. 1A, 1B, may be operable by computing device 2 to perform any variety of operations. For instance, application modules 12 may include a word processor, a text messaging application, an instant messaging application, an email application, a web browser, a multimedia player, a calendar application, an operating system, a distributed computing application, a graphic design application, a video editing application, a web development application, or any other application. Application modules 12 may be operable to send data representing at least a portion of a GUI to UI module 8 for presentation by UI device 4. Application modules 12 may additionally or alternatively be operable to receive various inputs, such as text input (e.g., from keyboard module 10) and/or other input (e.g., from UI module 8). For example, one of application modules 12 (e.g., application module 12A) may include functionality of a note-taking application. Application 12A may be operable to provide data to UI module 8 for presentation at UI device 4.

In the example of FIGS. 1A, 1B, keyboard module 10 may be operable by computing device 2 to output a graphical keyboard for display and/or provide text input to one or more of application modules 12. That is, keyboard module 10 may transmit, as output to UI module 8 (e.g., for inclusion as a graphical keyboard of a GUI) a keyboard layout including a plurality of keys related to one or more written languages (e.g., English, Spanish, Chinese, etc.). Keyboard module 10 may assign one or more characters or operations to each key of the plurality of keys in the keyboard layout. For instance, keyboard module 10 may generate a QWERTY keyboard layout including keys that represent characters used in typing the English language (e.g., "A," "B," "1," "#," etc.). The QWERTY keyboard layout may also include keys that represent operations used in typing the English language (e.g., backspace, delete, spacebar, enter, shift, etc.). Keys that represent operations may be referred to herein as "non-character" keys. That is, a non-character key as defined herein represents a key of a graphical keyboard that does not correspond to a letter, a number, a symbol, or other character.

In the example of FIGS. 1A, 1B, UI module 8 may receive information from application module 12A representing one or more GUIs to be output for display. The GUIs may, in some examples, include a placeholder for a graphical keyboard. UI module 8 may receive, from keyboard module 10, information representing a graphical keyboard to be included in the GUIs. For instance, UI module 8 may receive the information from keyboard module 10 in response to sending a request for a graphical keyboard to keyboard module 10.

Based on the information received from application module 12A and keyboard module 10, UI module 8 may cause UI device 4 to present a graphical keyboard as part of a GUI, such as GUIs 14, 24, and 34. GUIs 14, 24, and 34 each includes graphical elements displayed at various locations of UI device 4. As shown in FIGS. 1A, 1B, each of GUIs 14, 24, and 34 includes edit region 16A and graphical keyboard 16B. Edit region 16A may, in various examples, include graphical elements representing inputted content, such as images, objects, hyperlinks, characters of text, etc. Graphical keyboard 16B includes graphical elements that represent keys of the graphical keyboard. GUIs 14, 24, and 34 also include candidate string regions 18A-18C that may include selectable spelling corrections or character string suggestions (also referred to as "candidate strings") to place or replace character strings in edit region 16A.

In the example of FIGS. 1A, 1B, edit region 16A may initially be blank. For instance, edit region 16A may display the contents of a new note into which the user of computing device 2 has not inputted any content. In some examples, candidate string regions 18A-18C may also be blank. In other examples, one or more of candidate string regions 18A-18C may display a suggested next word or phrase, despite the fact that the user has not yet provided any input.

In accordance with the techniques of the present disclosure, computing device 2 may receive indications of a first gesture portion detected at UI device 4. For instance, a user of computing device 2 may provide gesture user input 20A (or simply "gesture portion" 20A) at a location of UI device 4 that corresponds to a location at which graphical keyboard 16B is presented for display. Gesture portion 20A may represent a first portion of a gesture 20. That is, gesture portion 20A may be the start of a continuing gesture 20, but may not, by itself, represent a complete gesture. In some examples, a gesture portion may be a subset of a gesture. A gesture portion may include or correspond to a subset of locations of a set of locations for a gesture.

Responsive to receiving gesture portion 20A, UI device 4 may send information indicating gesture portion 20A to UI module 8. UI module 8 may receive the information and assemble the information into a time-ordered sequence of motion events (e.g., each motion event including a location component, a time component, and an action component). For instance, UI module 8 may generate an initial motion event indicating location 22A and a touch-down action that represents the start of a gesture. Thereafter, UI module 8 may generate subsequent motion events, such as motion events indicating locations 22B, 22C, and 22D, as UI module 8 receives information indicating the progression of gesture portion 20A. UI module 8 may send the generated motion events to keyboard module 10. Keyboard module 10 may receive the sequence of motion events along with the information associated with each motion event (e.g., location, time, action, etc.) from UI module 8.

Based at least in part on the first gesture portion, computing device 2 may determine at least one candidate string. Each determined candidate string may represent a possible text input intended by the user. As keyboard module 10 receives the sequence of motion events for gesture portion 20A, keyboard module 10 may use the sequence of motion events to determine one or more candidate strings. For instance, keyboard module 10 may compare the location component of each motion event in the sequence of motion events to the locations at which one or more keys of graphical keyboard 16B are presented for display to determine one or more keys whose displayed locations at least approximately correspond to the locations of motion events in the sequence of motion events. Based at least in part on the determined one or more keys, keyboard module 10 may determine the one or more candidate strings. In the example of FIGS. 1A, 1B, based on the sequence of motion events indicating locations 22A, 22B, 22C, and 22D, keyboard module 10 may determine a first candidate string, "thus," a second candidate string, "this," and a third candidate string, "this'd." In other words, responsive to receiving gesture portion 20A, computing device 2 may determine that the user intended to input one or more of "thus," "this," or "this'd."

Computing device 2 may output, at a first location of UI device 4, the at least one candidate string. For instance, after determining the three candidate strings, keyboard module 10 may send data to UI module 8 indicating the candidate strings for inclusion in candidate string regions 18A-18C. In some examples, such as the example of FIGS. 1A, 1B, keyboard module 10 may send data to UI module 8 indicating a particular candidate string for inclusion in edit region 16A. The particular candidate string indicated for inclusion in edit region 16A may be the candidate string that computing device 2 determined as most likely to represent the user's intended input. Thus, in the example of FIGS. 1A, 1B, keyboard module 10 may determine, based on the received indications of gesture portion 20A, that "this" is most likely to represent the user's desired text input.

UI module 8 may receive the data from keyboard module 10 and, in response, UI module 8 may cause UI device 4 to update the displayed GUI to include the candidate strings. That is, UI module 8 may cause UI device 4 to output GUI 14 of FIG. 1A. In other words, GUI 14 of FIG. 1A may represent a GUI output by computing device 2 after receiving gesture portion 20A.

Computing device 2 may receive an indication of a second gesture portion that traverses a location of UI device 4 that corresponds to the at least one candidate string. For instance, in providing gesture portion 20A, the user may have intended to input the text "thus." However, computing device 2 determined that the candidate string that most likely represents the user's intended input is "this." To correct this, the user may want to select the candidate string showing the text input he or she desires to input (e.g., the user may want to select "thus" shown in candidate string region 18A). In accordance with the techniques of the present disclosure, instead of having to cease the current gesture 20 to make a selection of candidate string region 18A (e.g., thereby indicating that "thus" is the user's intended input), the user may make the selection by continuing gesture 20. For instance, the user may provide gesture user input 20B (or simply "gesture portion" 20B) moving to a location of UI device 4 that corresponds to a location at which candidate string region 18A is presented for display. Gesture portion 20B may represent a second portion of the gesture initiated by gesture portion 20A. In other words, in the example of FIGS. 1A, 1B, first gesture portion 20A and second gesture portion 20B are included in a single continuous gesture 20, but are referred to differently herein for purposes of illustration.

Responsive to receiving gesture portion 20B, UI device 4 may send information indicating gesture portion 20B to UI module 8. UI module 8 may receive the information and generate additional motion events (e.g., including location, time, action, etc.) for gesture portion 20B. For instance, UI module 8 may generate motion events indicating locations 28A, 28B, and 28C as UI module 8 receives information indicating the progression of gesture portion 20B. UI module 8 may send the generated motion events to keyboard module 10. Keyboard module 10 may receive the sequence of motion events along with the information associated with each motion event from UI module 8.

Based at least in part on the second gesture portion, computing device 2 may select the at least one candidate string. That is, keyboard module 10 may select the candidate string outputted in one of candidate string regions 18A-18C if keyboard module 10 receives a motion event indicating a location that at least approximately corresponds to the location at which one of candidate string regions 18A-18C is output for display. In the example of FIGS. 1A, 1B, for instance, keyboard module 10 may receive the motion events indicating locations 28A, 28B, and 28C. Keyboard module 10 may determine that location 28A does not correspond to the location at which any of candidate string regions 18A-18C is output for display and thus keyboard module 10 may not select any candidate string. Similarly, keyboard module 10 may determine that location 28B does not correspond to the location at which any of candidate string regions 18A-18C is output for display and thus keyboard module 10 may not select any candidate string. Keyboard module 10 may determine, however, that location 28C does correspond to the location at which candidate string region 18A is output for display, and thus keyboard module 10 may select the candidate string, "thus," displayed at candidate string region 18A.

In some examples, keyboard module 10 may select a particular candidate string by determining the particular candidate string to be the candidate string that is most likely to represent a user's intended input. That is, as a result of keyboard module 10 selecting a particular candidate string (e.g., based on user input), the particular candidate string may thereafter be the candidate string most likely to represent the input the user desired to provide when performing gesture portion 20A. Thus, by performing gesture portion 20B, the user may instruct computing device 2 how to more correctly interpret the input of gesture portion 20A.

Computing device 2 may output, for display at a second location of UI device 4, the at least one candidate string. For instance, responsive to selecting the candidate string "thus," based on gesture portion 20B, keyboard module 10 may send data to UI module 8 indicating the candidate string "thus" for inclusion in edit region 16A (e.g., replacing the displayed candidate string "this"). UI module 8 may receive the data from keyboard module 10 and, in response, UI module 8 may cause UI device 4 to update the display GUI to include the candidate string "thus" in edit region 16A. That is, UI module 8 may cause UI device 4 to output GUI 24 of FIG. 1A. In other words, GUI 24 of FIG. 1A may represent a GUI output by computing device 2 after receiving gesture portion 20A and gesture portion 20B.

In the example of FIGS. 1A, 1AB, candidate strings "thus," "this," and "this'd" are still shown in candidate string regions 18A-18C of GUI 24, respectively. In some examples, however, in addition to or as an alternative to causing UI device 4 to display the selected candidate string in edit region 16A, keyboard module 10 may, responsive to selecting a candidate string, cause UI device 4 to modify the display of candidate strings in candidate string regions 18A-18C. For instance, the displayed candidate strings may be rearranged so that the selected candidate string appears in a different one of candidate string regions 18A-18C. Rearranging the candidate strings within candidate string regions 18A-18C may reflect the fact that the candidate string most likely to represent the user's desired input has changed (e.g., from "this" to "thus").

In some examples, responsive to selecting a candidate string, keyboard module 10 may cause UI device 4 to cease displaying candidate strings in candidate string regions 18A-18C or to display candidate strings that represent possible next inputs. That is, responsive to selecting a candidate string, keyboard module 10 may output information to cause UI device 4 to modify a displayed GUI in various ways.

Computing device 2 may receive an indication of a third gesture portion detected at UI device 4. That is, after providing gesture portion 20A to input text and gesture portion 20B to input a selection of a displayed candidate string, the user may continue gesture 20 in order to provide additional text input. In accordance with the techniques described herein, the user may be able to continue the current gesture to input additional text (e.g., additional characters of a current word and/or characters of a new word) after selection of a candidate string. Turning to FIG. 1B, for instance, the user may provide gesture user input 20C (or simply "gesture portion 20C") at a location of UI device 4 that corresponds to the location at which graphical keyboard 16B is presented for display. Gesture portion 20C may represent the end of the continuous gesture 20 that also includes gesture portions 20A and 20B.

Responsive to receiving gesture portion 20C, UI device 4 may send information indicating gesture portion 20C to UI module 8. UI module 8 may receive the information and generated additional motion events (e.g., indicating location, time, action, etc.). For instance, UI module 8 may generate motion events indicating locations 38A, 38B, and 38C. The motion event indicating location 38C may indicate a touch-up action, representing the end of a gesture. UI module 8 may send the generated motion events to keyboard module 10. Keyboard module 10 may receive the sequence of touch-events along with the information associated with each motion event from UI module 8.

Based at least in part on the third gesture portion, computing device 2 may determine new candidate strings. That is, as keyboard module 10 receives the sequence of motion events for gesture portion 20C, keyboard module 10 may use the sequence of motion events to determine new candidate strings. In some examples, new candidate strings after a selection of a candidate string may be based not only on motion events corresponding to the current gesture portion, but also on motion events corresponding to one or more previous gesture portions. In some examples, such as the example of FIGS. 1A, 1B, after keyboard module 10 receives motion events that correspond to a selection of a candidate string, keyboard module 10 may determine new candidate strings based only on gesture portions received subsequent to the selection. That is, responsive to receiving a selection of a candidate string, keyboard module 10 may cause computing device 2 to "commit" the selected candidate string, and thereafter determine candidate strings using only the motion events received after the selection. Thus, responsive to receiving motion events indication locations 38A, 38B, and 38C, keyboard module 10 may determine new candidate strings "farr," "far," and "fare."

After determining the new candidate strings, keyboard module 10 may send data to UI module 8 indicating the new candidate strings for inclusion in candidate string regions 18A-18C. Additionally or alternatively, keyboard module 10 may send data to UI module 8 indicating a particular new candidate string for inclusion in edit region 16A. UI module 8 may receive the data from keyboard module 10 and, in response, UI module 8 may cause UI device 4 to update the displayed GUI to include the new candidate strings. That is, UI module 8 may cause UI device 4 to output GUI 34 of FIG. 1B. In other words, GUI 34 of FIG. 1B may represent a GUI output by computing device 2 after receiving gesture portion 20A, gesture portion 20B, and gesture portion 20C.

By enabling computing devices to receive and process text input and candidate string selection in one, continuous gesture, the techniques of this disclosure may improve the speed and accuracy of text input, reducing the time required for a user to input text and/or correct inputted text. Furthermore, for devices having limited power reserves (e.g., battery-powered devices), the techniques described herein may improve battery life by reducing the amount of time users need to interact with the device to input text. In other words, by allowing the user to use one continuous gesture to input text and/or select suggestions, the techniques described herein may improve the overall user experience of various computing devices.

In some examples, a computing device configured in accordance with the techniques described herein may additionally or alternatively allow users to select and/or input non-character keys mid gesture. That is, the computing device may be operable to receive one or more indications of a continuous gesture input that traverses respective locations associated with multiple keys and may incrementally determine suggestions. The computing device may receive additional indications of the continuous gesture input as the user gestures to a non-character key, such as the delete key. Responsive to receiving the additional indications, the computing device may remove at least a portion of the previously provided input, as if the user had ceased the continuous gesture and tapped or otherwise selected the delete key. Thereafter, the user may, in some examples, continue the gesture to input additional text. Such techniques, in various examples, may also enable a computing device to accommodate mid-gesture selection of an enter key, a shift key, or another non-character key.

Figure 2:
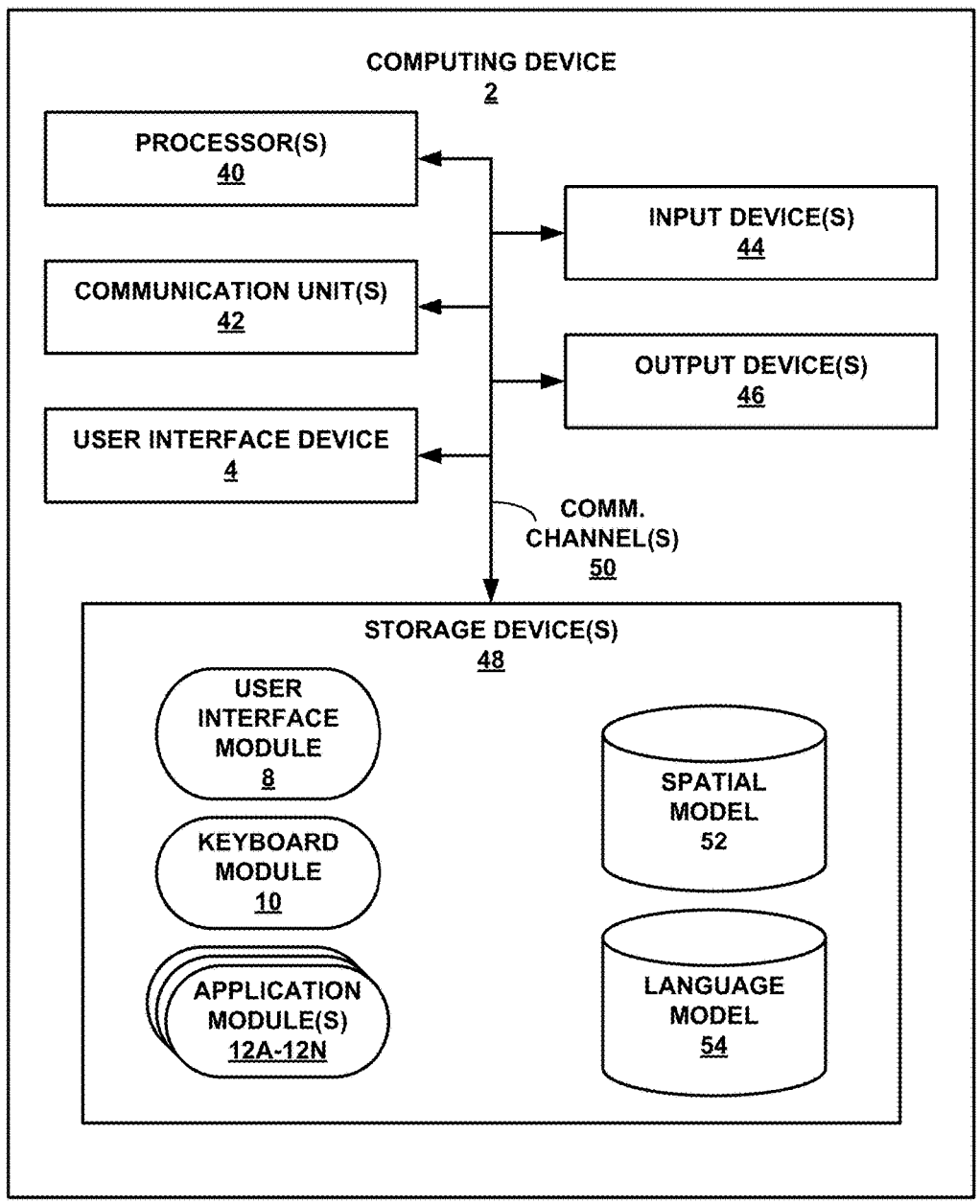
FIG. 2 is a block diagram illustrating details of one example of a computing device for enabling selection of suggestions and non-character selection during continuous gesture input, in accordance with one or more techniques of the present disclosure.

FIG. 2 is a block diagram illustrating details of one example of computing device 2 for enabling selection of suggestions and non-character selection during continuous gesture input, in accordance with one or more techniques of the present disclosure. The example of FIG. 2 is described below within the context of FIG. 1. FIG. 2 illustrates only one particular example of computing device 2, and many other examples of computing device 2 may be used in other instances. In some examples, computing device 2 may include fewer components than shown in the example of FIG. 2 or may include additional or different components not shown in the example of FIG. 2.

In the example of FIG. 2, computing device 2 includes UI device 4, one or more processors 40, one or more communications units 42, one or more input devices 44, one or more output devices 46, and one or more storage devices 48. Storage devices 48 of computing device 2 also include UI module 8, keyboard module 10, one or more application modules 12, spatial model 52 and language module 54. Communication channels 50 may interconnect each of the components 4, 40, 42, 44, 46, 48, 8, 10, 12, 52, and 54, for inter-component communications (physically, communicatively, and/or operatively). In some examples, communication channels 50 may include a system bus, a network connection, an inter-process communication data structure, or any other method for communicating data.

One or more communication units 42 of computing device 2 may communicate with external devices via one or more networks by transmitting and/or receiving network signals on the one or more networks. For example, computing device 2 may use communication units 42 to transmit and/or receive radio signals on a radio network such as a cellular radio network. Likewise, communication units 42 may transmit and/or receive satellite signals on a satellite network such as a GPS network. Examples of communication units 42 include a network interface card (e.g. such as an Ethernet card), an optical transceiver, a radio frequency transceiver, a GPS receiver, or any other type of device that can send and/or receive information. Other examples of communication units 42 may include Bluetooth®, GPS, 3G, 4G, and Wi-Fi® radios found in mobile devices as well as Universal Serial Bus (USB) controllers.

One or more input devices 44 of computing device 2 may receive input. Examples of input are tactile, audio, and video input. Input devices 44 of computing device 2, in various examples, include a mouse, keyboard, voice responsive system, video camera, microphone or any other type of device for detecting input from a human or machine. In some examples, input devices 44 may include a presence-sensitive input device, which may include presence-sensitive screen, touch-sensitive screen, etc.

One or more output devices 46 of computing device 2 may generate output. Examples of output are tactile, audio, and video output. Output devices 46 of computing device 2, in various examples, include a presence-sensitive screen, sound card, video graphics adapter card, speaker, cathode ray tube (CRT) monitor, liquid crystal display (LCD), or any other type of device for generating output to a human or machine. Output devices 46 may include display devices such as cathode ray tube (CRT) monitor, liquid crystal display (LCD), or any other type of device for generating visual output.

In some examples, UI device 4 of computing device 2 may include functionality of one or more of input devices 44 and/or output devices 46. In the example of FIG. 2, for instance, UI device 4 may be or may include a presence-sensitive input device, such as a presence-sensitive screen, touch-sensitive screen, etc. In some examples, a presence-sensitive screen may detect an object at and/or near the presence-sensitive screen. As one example range, UI device 4 may detect an object, such as a finger or stylus that is within 2 inches or less of the presence-sensitive screen. The presence-sensitive screen may determine a location (e.g., an (x,y) coordinate) of the presence-sensitive screen at which the object was detected. In another example range, a presence-sensitive screen may detect an object 6 inches or less from the presence-sensitive screen. Other ranges are also possible. The presence-sensitive screen may determine the location of the screen selected by a detected object using capacitive, inductive, and/or optical recognition techniques. In some examples, UI device 4 provides output to a user of computing device 2 using tactile, audio, or video stimuli as described with respect to output devices 46. In the example of FIG. 2, for instance, UI device 4 may present a user interface, such as GUIs 14, 24, 34 of FIG. 1.

While illustrated as internal components of computing device 2, UI device 4, input devices 44, and/or output devices 46 may, in some examples, represent external components that share a data path with other components of computing device 2, for transmitting and/or receiving input and output. For instance, in one example, UI device 4 represents a built-in component of computing device 2, located within and physically connected to the external packaging of computing device 2 (e.g., a screen on a mobile phone). In another example, UI device 4 may be an external component of computing device 2 located outside and physically separated from the packaging of computing device 2 (e.g., a monitor, a projector, etc. that shares a wired and/or wireless data path with a tablet computer).

One or more storage devices 48, within computing device 2, may store information for processing during operation of computing device 2. In some examples, storage devices 48 represent temporary memory, meaning that a primary purpose of storage devices 48 is not long-term storage. In some examples, storage devices 48 may be configured for short-term storage of information as volatile memory and therefore may not retain stored contents when powered off. Examples of volatile memories include random access memories (RAM), dynamic random access memories (DRAM), static random access memories (SRAM), and other forms of volatile memories known in the art.

In some examples, storage devices 48 may include one or more computer-readable storage media. That is, storage devices 48 may, in some examples, be configured to store larger amounts of information than volatile memory. Storage devices 48 may further be configured for long-term storage of information as non-volatile memory space and thus may retain information even when powered off. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 8, keyboard module 10, application modules 12, spatial model 52 and/or language model 54.

One or more processors 40 may implement functionality and/or execute instructions within computing device 2. For example, processors 40 of computing device 2 may receive and execute instructions stored by storage devices 48, thereby enabling the functionality of UI module 8, keyboard module 10, application modules 12, spatial model 52 and/or language model 54. In some examples, the execution of these instructions, by processors 40, may cause computing device 2 to store information within storage devices 48 during program execution. UI module 8, keyboard module 10, application modules 12, spatial model 52 and language model 54 may be operable by processors 40 to perform various actions, including receiving indications of a gesture performed at locations of UI device 4 and causing UI module 8 to present GUIs 14, 24, 34 at UI device 4.

In accordance with aspects of the present disclosure, keyboard module 10 may initially send data to UI module 8 that causes UI device 4 to output a graphical keyboard for display. The graphical keyboard may include a plurality of keys. At least one of the plurality of keys may be associated with one or more characters. In some examples, at least one of the plurality of keys may not be associated with any character. That is, in some examples, the graphical keyboard may include one or more non-character keys, such as an enter key, a shift key, a delete key, or other keys.

In some examples, UI module 8 may receive an indication of a first gesture portion detected at a presence-sensitive input device that is operatively coupled to computing device 2. For instance, UI module 8 may receive an indication of a first gesture portion from UI device 4 and/or input device 42. In another example, UI module 8 may receive an indication of a first gesture portion from communication unit 44, such as when a presence-sensitive input device is separate from computing device 2 as further illustrated in FIG. 3. UI module 8 may process the indication of the first gesture portion and send one or more motion events that correspond to the first gesture portion to keyboard module 10.

Keyboard module 10 may receive the motion events that correspond to the first gesture portion and determine, based at least in part on the first gesture portion, at least one candidate string. That is, keyboard module 10 may use the received motion events to determine input that corresponds to the performed gesture portion. To determine the at least one candidate string, keyboard module 10 may use a spatial model 52 and/or a language model 54.

Spatial model 52, in general, may generate one or more probabilities that a particular key of a displayed graphical keyboard has been selected based on location data associated with a user input. In some examples, spatial model 52 includes a bivariate Gaussian model for each key. The bivariate Gaussian model for a key may be based on a distribution of coordinates (e.g., (x,y) coordinate pairs) that correspond to the given key. For instance, the Gaussian model for the key may be based on coordinate pairs that correspond to locations of one of output devices 46 at which the key is displayed and/or locations of one of input devices 44 at which input is received. More specifically, in some examples, the bivariate Gaussian model for a key may be based on a distribution of coordinates that correspond to locations (e.g., of UI device 4, input devices 44, and/or output devices 46) that are most frequently selected by a user when the user intends to select the given key. In other words, the bivariate Gaussian model for a key may represent the key and provide a probability value that a given location (e.g., a location of user input) corresponds to the key.

Keyboard module 10 may use spatial model 52 to compare the location components (e.g., coordinates) of one or more motion events in the sequence of motion events to respective locations of one or more keys of a displayed graphical keyboard and generate a probability based on these comparisons that a selection of a key occurred. In some examples, keyboard module 10 may generate a spatial model score using spatial model 52. The spatial model score may indicate a probability of a selected key based at least in part on locations of UI device 4 traversed by a gesture or gesture portion. In some examples, a spatial model score may indicate a combined probability of a group of selected keys based at least in part on locations of UI device 4 traversed by a gesture.

For example, keyboard module 10 may use spatial model 52 to compare the location component of one or more motion event in the sequence of motion events to a key location of a particular key of a displayed graphical keyboard. The location component of each motion event in the sequence may include one location of UI device 4. A key location (e.g., a centroid of a key) of a key in the displayed graphical keyboard may include a different location of UI device 4. Keyboard module 10 may use spatial model 52 to determine a Euclidian distance between the two locations and generate a probability based on the Euclidian distance that the key was selected. Spatial model 52 may indicate a higher probability for a key that shares a smaller Euclidian distance with one or more motion events than a key that shares a greater Euclidian distance with one or more motion events. Based on the spatial model probability associated with each key, keyboard module 10 may assemble the individual key selections with the highest spatial model probabilities into a time-ordered sequence of keys that keyboard module 10 may then determine represents a character string. The combined probabilities of each key may represent a spatial model score for the character string.

Keyboard module 10 may use language model 54 to determine language model scores for one or more characters strings based on the sequence of keys corresponding to motion events. That is, keyboard module 10 may incrementally generate a group of one or more character strings using language model 54 in response to receiving indications of one or more gestures or gesture portions. A character string may be a group of characters comprising a prefix, or portion of, a character string included in language model 54. In some examples, a character string may be a group of characters comprising a complete character string included in language model 54. As keyboard module 10 receives indications of a gesture or gesture portion being performed at an input device (e.g., UI device 4), keyboard module 10 may incrementally determine spatial and language model scores corresponding to one or more character strings. Using the spatial and language model scores, keyboard module 10 may determine a combined score for each character string based on the spatial and language model score for the character string. Keyboard module 10 may update the spatial, language, and/or combined scores incrementally as keyboard module 10 receives subsequent indications of further performance of the gesture or gesture portion. The combined score for a character string may indicate a probability that the character string represents the intended input given the gesture or gesture portion.

Generally, language model 54 may include a list of character strings, e.g., words, within a written language vocabulary. In some examples, language model 54 may be based on and/or include a set of character strings based on a dictionary (e.g., that includes a vocabulary of words) stored at computing device 2 (not shown) or a remote computing device that is accessible by computing device 2. In some examples, the dictionary may include a vocabulary of words. A vocabulary of words may be a body of words used in a written and/or spoken language. A dictionary may be implemented as a data structure that stores one or more words of a vocabulary in a structured manner. Language model 54 may indicate a probability of each respective character string based on the frequency with which the character string occurs in a given language context. For instance, the character string "door" may be more frequently used in the English language following the character string "the" and therefore associated with a larger probability than, for example, the character string "think" following the character string "the."

Keyboard module 10 may perform a lookup in language model 54 to identify one or more character strings (e.g., words) in language model 54 that include a part of or all of a group of characters associated with keys corresponding to a gesture or gesture portion. Language model 54 may implement one or more n-gram language models. An n-gram language model may provide a probability distribution for an item, $x_i$ (a letter, word, punctuation character or other delimiter) in a contiguous sequence of items based on the previous items in the sequence (i.e., $P(x_i|x_{i-(n-1)}, \ldots, x_{i-1})$). For instance, a character-level bigram language model (an n-gram model where n=2), may provide a probability that the letter "w" follows the sequence of letters "no". In another example, a word-level trigram language model may provide a probability that "fox" follows the word sequence "the quick brown."

Keyboard module 10 may use language model 54 to determine a language model score for a character string based on a language context that may include, but is not limited to, e.g., a character corresponding to indication of the gesture performed by the user, character strings in a dictionary and/or previously inputted character strings, etc. For example, keyboard model 10 may determine a group of characters associated with keys corresponding to a gesture or gesture portion. The group of characters may be a prefix or portion of a character string. The character string may be included in language model 54. Keyboard module 10 may search or "look ahead" to determine one or more character strings in language model 54 that correspond respectively to the prefix. For instance, given a character string s-a-t, keyboard module 10 may determine, using language model 54 the probability of a character string satin. Keyboard module 10 may determine a language model score based on the probability. In this way, character strings in language model 54 having higher probabilities in a given language context may have higher language model scores.

In some examples, keyboard module 10 may perform a lookup of multiple different groups of characters associated with keys corresponding to a gesture, for example, where each group of characters may be a prefix or portion of a character string. Keyboard module 10 may use language model 54 to identify one or more character strings in language model 54 that include a part of or all of the characters of the group of characters that may be a prefix or portion of the character string. As shown in FIG. 1A, a user may perform gesture portion 20A at UI device 4 that traverses the keys t-h-i-s. Keyboard module 10 may therefore perform a lookup of prefix t-h-i to determine a group of character strings that begin with t-h-i. Similarly, keyboard module 10 may perform a lookup of prefix t-i-s to determine a group of character strings that begin with t-i-s.

In some examples, keyboard module 10 determines a combined score for each character string based at least in part on the respective spatial and language module scores for each respective character string. The combined probability for a character string may therefore represent the probability of the character string based on a language context and the accuracy of a gesture given a set of keys. Keyboard module 10 may order each character string in a group of character strings by combined score in descending order from most probable character string to least probable character string. In some examples, keyboard module 10 may determine the at least one candidate string based on the one or more character strings with the highest probabilities.

Keyboard module 10 may output, for display at a first location of a display device that is operatively coupled to computing device 2, the at least one candidate string. For instance, keyboard module 10 may provide an indication of the at least one candidate string to UI module 8 for display at UI device 4. The at least one candidate string may be output for display at a first location of UI device 4, such as a location corresponding to candidate string regions 18A-18C, and/or a location corresponding to edit region 16A.

UI module 8 may receive an indication of a second gesture portion detected at a presence-sensitive input device that is operatively coupled to computing device 2. Responsive to receiving the indication, UI module 8 may output one or more motion events to Keyboard module 10. That is, after a user performs the first portion of the gesture, keyboard module 10 may continue receiving motion events corresponding to a second portion of the gesture. In general, as keyboard module 10 continues to receive motion events of a gesture, keyboard module 10 may continue to use spatial model 52 and language model 54 to determine candidate strings. However, as keyboard module 10 receives indications of the gesture (e.g., motion events), keyboard module 10 may determine whether the gesture indicates a selection of the at least one candidate string and/or a selection of a non-character key of the displayed graphical keyboard. That is, as the user continues the gesture, keyboard module 10 may determine whether the received motion events (e.g., the last motion event, the last 2 motion events, the last 10 motion events, etc.) indicate that the user intends to select a candidate string or a non-character key.

Keyboard module 10 may determine that that the gesture indicates a selection of a candidate string or a selection of a non-character key in a variety of ways. For instance, as keyboard module 10 receives motion events, keyboard module 10 may make the determination using one or more locations included in the motion events, one or more times included in the motion events, one or more actions included in the motion events, and/or other information included in the motion events. As one example, keyboard module 10 may determine that the gesture indicates a selection of a candidate string based on two motion events having locations that form a substantially straight line path toward a location corresponding to where the candidate string is displayed. In the example of FIG. 1, for instance, keyboard module 10 may determine that locations 28A and 28B of gesture portion 20B form substantially a straight line path toward candidate string region 18A. As another example, keyboard module 10 may determine that the gesture indicates a selection of a candidate string or a selection of a non-character key based additionally or alternatively on a speed of the gesture. For instance, keyboard module 10 may determine that a gesture indicates a selection of an enter key (or other non-character key) by using the time of each motion event to determine a speed of the gesture and, based on the speed of the gesture satisfying a threshold and the motion events having locations forming a path toward the enter key, determining that the gesture indicates a selection of the enter key. The threshold may indicate a speed value, and, in some examples, a speed of a gesture may satisfy the threshold when the speed of the gesture is greater than the threshold speed value. In other examples, the speed of the gesture may satisfy the threshold when the speed of the gesture is less than the threshold speed value.

If keyboard module 10 determines that the received indications of the gesture (e.g., motion events) indicate a selection of a candidate string and/or a selection of a non-character key, keyboard module 10 may suspend candidate string determination in order to allow time for the gesture to reach the candidate string and/or non-character key without causing the candidate strings to change. In some examples, keyboard module 10 may suspend candidate string determination while subsequent motion events of the gesture continue to indicate the selection. That is, keyboard module 10 may continue to receive subsequent motion events after determining that the received motion events indicate the selection, but keyboard module 10 may not process (e.g., using spatial model 52 and/or language model 54) any received subsequent motion events for candidate string determination unless and until candidate string determination is resumed. In other words, upon determining that a gesture indicates the selection of a candidate string or non-character key, keyboard module 10 may (at least temporarily) stop updating candidate strings. In some examples, keyboard module 10 may store (e.g., in a buffer of computing device 2) the subsequent indications of the gesture (e.g., subsequent motion events) that are received subsequent to suspending the candidate string determination. In some examples, keyboard module 10 may not store the subsequent indications of the gesture.

After suspending candidate string determination, keyboard module 10 may continue receiving indications of the gesture (e.g., motion events). In some examples, keyboard module 10 may determine that the indications of the gesture no longer indicate the selection of a candidate string and/or a selection of a non-character key. For instance, subsequently received motion events may indicate a change in direction of the gesture, a change in speed of the gesture, an end of the gesture, and/or another change. Responsive to determining that the gesture no longer indicates a selection of a candidate string and/or a selection of a non-character key, keyboard module 10 may resume candidate string determination. That is, in some examples (e.g., when keyboard module 10 stores motion events received after determining that the gesture indicates a selection of a candidate string), keyboard module 10 may process all motion events received while character string determination was suspended, in order to update the character strings or "catch up" to the current state of the gesture. In some examples (e.g., when keyboard module 10 does not store the subsequent motion events), keyboard module 10 may resume candidate string determination using the motion events received after keyboard module 10 determines that the gesture no longer indicates the selection of a candidate string and/or non-character key. That is, in some examples keyboard module 10 may retain motion events received during suspension of candidate string determination for later processing upon the resumption of candidate string determination while in other examples keyboard module 10 may resume candidate string determination without processing motion events received during suspension of candidate string determination.

After suspending candidate string determination, keyboard module 10 may, in some examples, receive an indication of the gesture that traverses a location corresponding to a candidate string or corresponding to a non-character key. For instance, UI module 8 may receive an indication of the second gesture portion that traverses a location of UI device 4 that corresponds to the at least one candidate string. Responsive to receiving the indication, UI module 8 may generate motion events and send the motion events to Keyboard module 8. As one example, in the example of FIG. 1, after suspending candidate string determination (e.g., based on motion events including locations 28A and 28B), keyboard module 10 may receive a motion event including location 28C. As shown in FIG. 1, location 28C intersects candidate string region 18A, which corresponds to the candidate string "thus."

Based at least in part on the second gesture portion, keyboard module 10 may select the at least one candidate string and/or the non-character key. For instance, responsive to receiving the motion event that includes location 28C of gesture portion 20B, keyboard module 10 may select the candidate string shown in candidate string region 18A (i.e., "thus"). In some examples, keyboard module 10 may select a candidate string by modifying the spatial model score, language model score, and/or combined score of one or more candidate strings. For instance, keyboard module 10 may select a candidate string by modifying the combined score of the candidate string to be an "ideal" score. That is, keyboard module 10 may set the combined score of the selected candidate string to a score that the selected candidate string would have received if the input was ideal.

In some examples, keyboard module 10 may select a candidate string by submitting the candidate string, as text input, to a relevant one of application modules 12. That is, keyboard module 10 may "commit" the selected candidate string. Committing a candidate string may, in some examples, include clearing all predicted character strings, such that any subsequent input to select character keys would cause keyboard module 10 to begin character string determination anew. In other examples, committing a candidate string may include determining, for each candidate string, that the committed candidate string is the only representation of the corresponding input. For instance, if, based on a sequence of motion events, keyboard module 10 determined three candidate strings, "cat", "car", and "cay", then received an indication of a gesture portion that traverses a location corresponding to the candidate string "cat", any subsequent indications of the gesture to select other character keys (e.g., a location near the "o" key) would not change the first 3 letters. That is, instead of possible character strings of "cato", "cati", "caro", "cari", "cayo", and "cavi", the only possible character strings would be "cato" and "cati".

In some examples, as part of selecting a candidate string and/or a non-character key, keyboard module 10 may discard or otherwise ignore indications of the gesture received subsequent to a previous suspension of candidate string determination. That is, if keyboard module 10 determines, based on one or more indications of a gesture, that the gesture indicates a selection of a candidate string or non-character key, keyboard module 10 may, in some examples, start storing subsequently received gesture indications. If keyboard module 10 then subsequently receives an indication of the gesture that traverses a location that corresponds to a candidate string or non-character key, keyboard module 10 may discard the stored gesture indications (e.g., by indicating that a buffer in which the indications are stored is no longer in use). In other words, keyboard module 10 may refrain from performing sequential determination of the at least one candidate string based on the stored gesture indications.

Keyboard module 10 may output, for display at a second location of the display device, the at least one candidate string. For instance, keyboard module 10 may provide an indication of the at least one candidate string to UI module 8 for display at UI device 4. The at least one candidate string may be output for display at a second location of UI device 4, such as a location corresponding to a different one of candidate string regions 18A-18C, and/or a location corresponding to edit region 16A. In the example of FIG. 1, for instance, the selected candidate string "thus," which was previously output for display within candidate string region 18A, may now be output for display within edit region 16A. Though not shown in FIG. 1, the candidate string "thus" may additionally or alternatively be displayed within candidate string region 18B.

Thereafter, UI module 8 may receive an indication of a third gesture portion detected at the presence-sensitive input device. For instance, UI module 8 may receive an indication of a third portion of the gesture detected at UI device 4. Responsive to receiving the indication, UI module 8 may generate one or more motion events and send the motion events to keyboard module 10.

Based at least in part on the third gesture portion, keyboard module 10 may determine one or more new candidate strings. That is, keyboard module 10 may process the motion events corresponding to the third gesture portion to determine new or updated candidate strings. In some examples, the candidate strings determined based on the third gesture portion may not be based on the first and second gesture portions at all. In some examples, the candidate strings determined based on the third gesture portion may also be based on the first gesture portion and/or the first and second gesture portion. By enabling a user to select a candidate string and/or a non-character key mid-gesture, the techniques of this disclosure may improve input performance and increase efficiency and accuracy.

Figure 3:
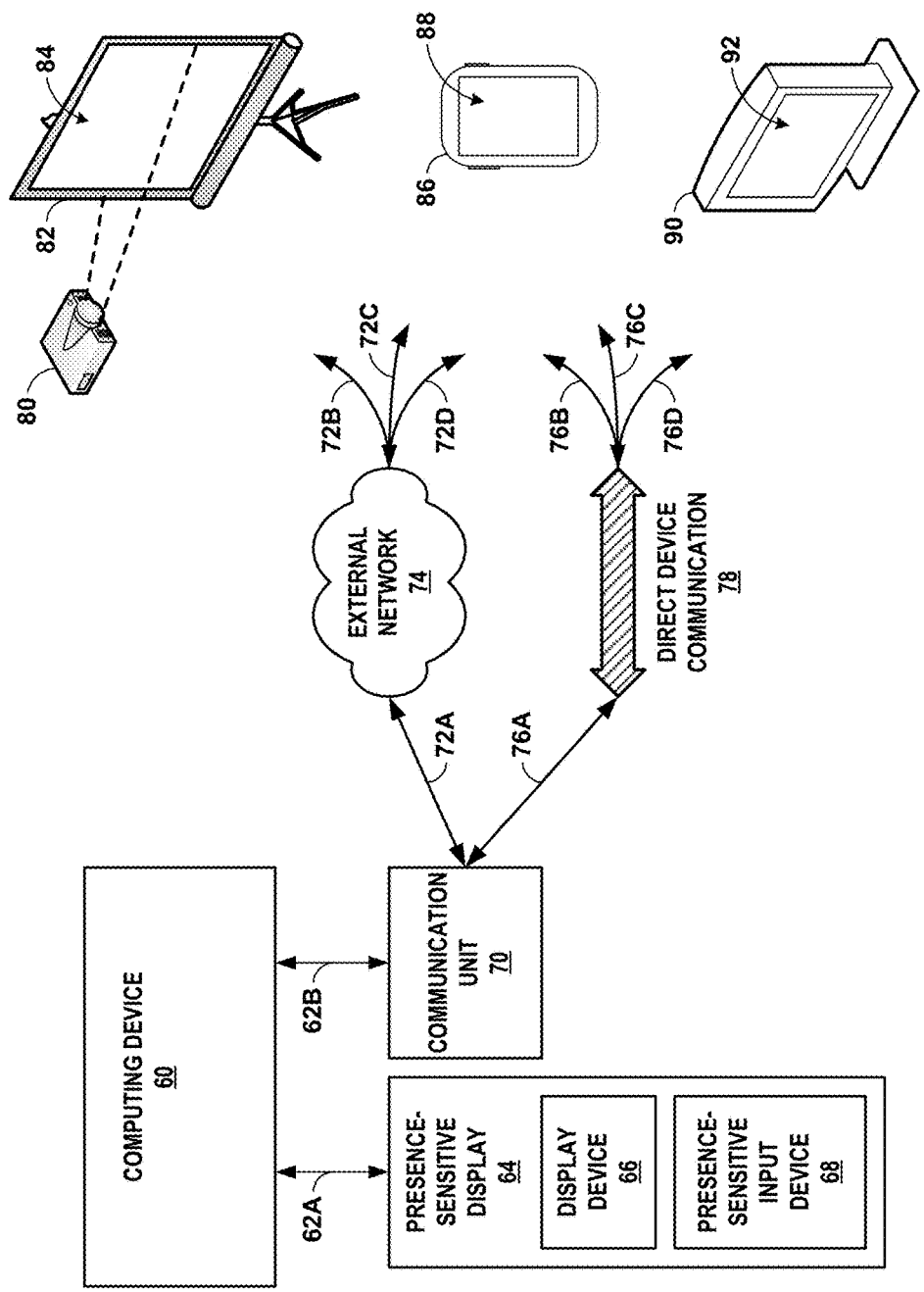
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a stand-alone computing device 2, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processor(s) 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 2 in FIGS. 1 and 2, a computing device may refer to a portable or mobile device such as mobile phones (including smart phones), laptop computers, etc. In some examples, a computing device may be a desktop computer, tablet computer, smart television platform, camera, personal digital assistant (PDA), server, mainframe, etc.

Presence-sensitive display 64 may be one example of UI device 4 as shown in FIG. 1. As shown in the example of FIG. 3, presence-sensitive display 64 includes display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures, etc.) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit (e.g., a stylus, a finger, etc.) over a graphical element displayed by display device 66, the location at which presence-sensitive input device 68 receives input corresponds to the location of display device 66 at which the graphical element is displayed. In other examples, presence-sensitive input device 68 may be positioned physically apart from display device 66, and locations of presence-sensitive input device 68 may correspond to locations of display device 66, such that input can be made at presence-sensitive input device 68 for interacting with graphical elements displayed at corresponding locations of display device 66.

As shown in the example of FIG. 3, computing device 60 may also include and/or be operatively coupled with communication unit 70. Communication unit 70 may include functionality of communication unit(s) 42 as described in the example of FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 60 may also include and/or be operatively coupled with one or more other devices, e.g., input devices, output devices, memory, storage devices, etc. that are not shown in the example of FIG. 3 for purposes of brevity and illustration.

The example of FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures, etc.) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of UI device 4 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures, etc.) at projector screen 82 using capacitive, inductive, and/or optical recognition techniques and send indications of such user input using one or more communication units to computing device 60.

The example of FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in the example of FIG. 3, mobile device 86 may include a presence-sensitive display 88. Visual display device 90 may include a presence-sensitive display 92. Presence-sensitive displays 88, 92 may include a subset of functionality or all of the functionality of UI device 4 as described in this disclosure. In some examples, presence-sensitive displays 88, 92 may include additional functionality. In any case, presence-sensitive display 92, for example, may receive data from computing device 60 and display the graphical content. In some examples, presence-sensitive display 92 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, and 72D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, WiFi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with techniques of the disclosure, computing device 60 may be operatively coupled to visual display device 90 using external network 74. Computing device 60 may output a graphical keyboard for display at presence-sensitive display 92. For instance, computing device 60 may send data that includes a representation of the graphical keyboard to communication unit 70. Communication unit 70 may send the data that includes the representation of the graphical keyboard to visual display device 90 using external network 74. Visual display device 90, in response to receiving the data using external network 74, may cause presence-sensitive display 92 to output the graphical keyboard.

Presence-sensitive display 92 may receive a first portion of a gesture (e.g., performed at a region of presence-sensitive display 92 that outputs the graphical keyboard). Responsive to receiving the first gesture portion, visual display device 90 may send at least one indication of the gesture portion to computing device 60 using external network 74. Communication unit 70 of may receive the indication of the gesture portion, and send the indication to computing device 60. In other words, computing device 60 may receive the indication of a first gesture portion detected at a presence-sensitive input device that is operatively coupled to the computing device.

Computing device 60 may determine, based at least in part on the first gesture portion, at least one candidate string. For instance, computing device 60 may employ a spatial model and/or language model to determine one or more character strings that may represent the input the user intended to provide in performing the first gesture portion. Computing device 60 may output the at least one candidate string for display at a first location of presence-sensitive display 92. For instance, computing device 60 may send data that includes a representation of the candidate string or candidate strings to communication unit 70. Communication unit 70 may send the data that includes the representation of the candidate string or candidate strings to visual display device 90 using external network 74. Visual display device 90, in response to receiving the data using external network 74, may cause presence-sensitive display 92 to output the at least one candidate string in one or more candidate string regions of a displayed graphical user interface. In other words, computing device 60 may output, for display at a first location of a display device that is operatively coupled to the computing device, the at least one candidate string.

Presence-sensitive display 92 may receive a second portion of the gesture that traverses (e.g., enters, passes through, nears, or otherwise comes into contact with) the candidate string region. In such example, the first gesture portion and the second gesture portion are included in a single continuous gesture. Responsive to receiving the second gesture portion, visual display device 90 may send at least one indication of the second gesture portion to computing device 60 using external network 74. Communication unit 70 of may receive the indication of the second gesture portion, and send the indication to computing device 60. In other words, computing device 60 may receive an indication of a second gesture portion that traverses a location of the presence-sensitive input device that corresponds to the at least one candidate string.

Based at least in part on the second gesture portion, Computing device 60 may select the at least one candidate string, thereby causing the at least one candidate string to be considered the candidate string most likely to represent the input the user intended to provide in performing the first gesture portion. That is, computing device 60 may modify or update its prediction of the text to be inputted by the first gesture portion based on receipt of the second gesture portion. Computing device 60 may output the at least one candidate string for display at a second location of presence-sensitive display 92. For instance, computing device 60 may send data that includes a representation of the candidate string or candidate strings to communication unit 70. Communication unit 70 may send the data that includes the representation of the candidate string or candidate strings to visual display device 90 using external network 74. Visual display device 90, in response to receiving the data using external network 74, may cause presence-sensitive display 92 to output the at least one candidate string in a different portion of the displayed graphical user interface, such as in a different candidate string region, in an entered text region, or in some other location. In other words, computing device 60 may output, for display at a second location of the display device, the at least one candidate string.

Figure 4A:
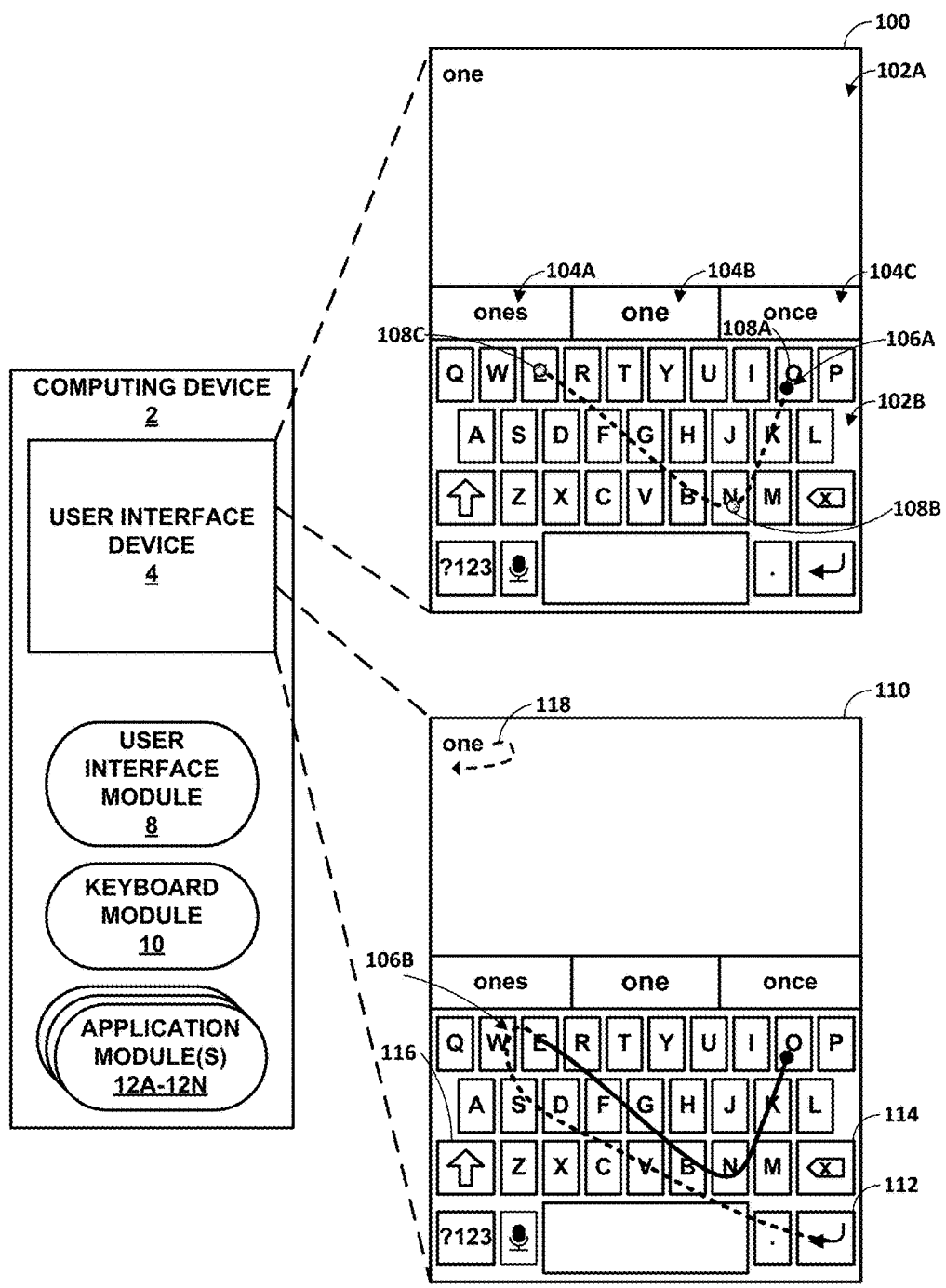
FIGS. 4A & 4B are block diagrams illustrating an example computing device and graphical user interfaces (GUIs) for enabling non-character selection during continuous gesture input, in accordance with one or more techniques of the present disclosure.
Figure 4B:
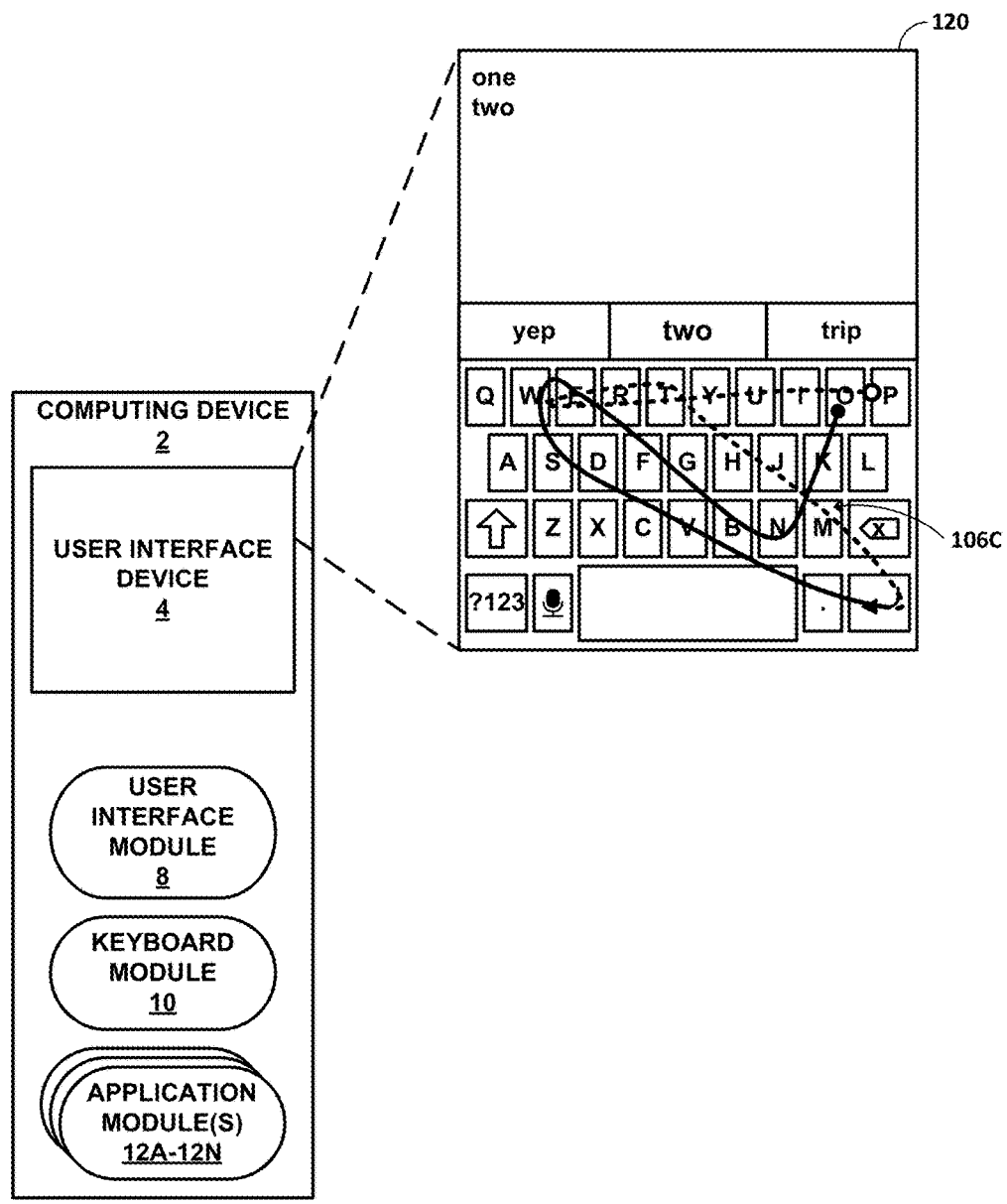

FIGS. 4A & 4B are block diagrams illustrating an example computing device 2 and graphical user interfaces (GUIs) for enabling non-character selection during continuous gesture input, in accordance with one or more techniques of the present disclosure. The example of FIGS. 4A, 4B is described below within the context of FIGS. 1 and 2. In the example of FIGS. 4A, 4B, computing device 2 includes UI device 4, UI module 8, keyboard module 10, and application modules 12. UI device 4 and modules 8, 10, and 12 may each have functionality similar to that described in FIGS. 1 and 2.

In the example of FIGS. 4A, 4B, computing device 2 may output, for display, a graphical keyboard comprising a plurality of keys. For instance, UI module 8 may receive information from one or more of applications 12 and keyboard module 10 for display. UI module 8 may cause UI device 4 to output GUI 100. GUI 100 includes edit region 102A, graphical keyboard 102B, and candidate string regions 104A-104C (collectively, "candidate string regions 104"). In the example of FIGS. 4A, 4B, edit region 102A may initially be blank. That is, edit region 102A may not display any text or other information. In some examples, candidate string regions 104 may also be initially blank.

In accordance with the techniques of the present disclosure, UI module 8 may receive an indication of a first gesture portion detected at UI device 4. For instance, a user of computing device 2 may provide gesture user input 106A (or simply "gesture portion" 106A) at a location of UI device 4 that corresponds to a location at which graphical keyboard 102A is presented for display. Gesture portion 106A may represent a first portion of a gesture 106. That is, gesture portion 106A may be the start of a continuing gesture 106, but may not, by itself, represent a complete gesture.

Responsive to receiving the indication of gesture portion 106A, UI module 8 may generate one or more motion events that correspond to gesture portion 106A. For instance, UI module 8 may generate a first motion event that includes location 108A and a touch-down action that represents the start of a gesture. Thereafter, UI module 8 may generate subsequent motion events, such as motion events indicating locations 108B and 108C, as UI module 8 receives information indicating the progression of gesture portion 106A. UI module 8 may send the generated motion events to keyboard module 10.

Based at least in part on the first gesture portion, keyboard module 10 may determine at least one candidate string. For instance, in the example of FIGS. 4A, 4B, after receiving the sequence of motion events 108A, 108B, and 108C, keyboard module 10 may determine a first candidate string, "one", a second candidate string "ones", and a third candidate string, "once". Keyboard module 8 may output, for display at a first location of UI device 4, the at least one candidate string. For instance, after determining the three candidate strings, keyboard module 10 may send data to UI module 8 indicating the candidate strings for inclusion in candidate string regions 104. In some examples, such as the example of FIGS. 4A, 4B, keyboard module 10 may send data to UI module 8 indicating a particular candidate string for inclusion in edit region 16A. UI module 8 may receive the data from keyboard module 10 and, in response, UI module 8 may cause UI device 4 to update the displayed GUI to include the candidate strings. That is, UI module 8 may cause UI device 4 to output GUI 100 of FIG. 4A.

Thereafter, UI module 8 may receive an indication of a second gesture portion that traverses a location of UI device 4 that corresponds to a non-character key of the graphical keyboard. For instance, the user may continue gesture 106 by providing gesture user input 106B (or simply "gesture portion" 106B). That is, the user may provide a single, continuous gesture to select one or more character keys of graphical keyboard 102B and to select one or more non-character keys. As shown in the example of FIGS. 4A, 4B, gesture portion 106B moves toward and traverses a location of UI device 4 that corresponds to enter key 112. In various examples, however, the techniques of the present disclosure may readily be applied to a traversal of locations corresponding to delete key 114, shift key 116, or any other non-character key.

Based at least in part on the second gesture portion, keyboard module 10 may execute an operation associated with the non-character key. For instance, in the example of FIGS. 4A, 4B, responsive to receiving one or more motion events indicating that gesture portion 106B traverses a location corresponding to enter key 112, keyboard module 10 may execute operation 118 to insert a carriage return. UI module 8 may receive an indication of the execution of operation 118 and cause UI device 4 to display an updated GUI. For instance, responsive to receiving the indication of the executed carriage return 118, UI module 8 may cause UI device 4 to output GUI 110 of FIG. 4A.

As additional examples of executing an operation associated with a non-character key, responsive to receiving indications that gesture portions traverse locations of delete key 114 and shift key 116, keyboard module 10 may delete at least a portion of the determined candidate strings and engage a capital letter mode, respectively. That is, by gesturing to delete key 114 mid-gesture, a user may cause computing device 2 (e.g., keyboard module 10) to remove the most recently added letter from the current candidate strings, remove a plurality of letters (e.g., letters added with a certain duration of time or other group), or remove the entirety of the current candidate strings. By gesturing to shift key 116 mid-gesture, the user may cause computing device 2 to enter a capital letter mode such that a next key (or a plurality of next keys) entered by the user (e.g., using the current gesture or a subsequent gesture) may be entered as if the user had pressed shift beforehand.

In some examples, in addition to or alternative to executing the operation associated with the non-character key, keyboard module 10 may update or modify one or more candidate strings. For instance, keyboard module 10 may, in some examples, commit the best candidate string. In this way, input received subsequent to the selection of the non-character key may cause keyboard module 10 to start candidate string determination anew.

In some examples, UI module 8 may receive an indication of a third gesture portion detected at UI device 4. That is, after providing gesture portion 106A to input text and gesture portion 106B to execute an operation associated with a non-character key, the user may continue gesture 106 in order to provide additional text input. Turning to FIG. 4B, for instance, the user may provide gesture user input 106C (or simply "gesture portion 106C"). Gesture portion 106C may represent the end of the continuous gesture 106 that also includes gesture portions 106A and 106B.

Based at least in part on the indication of third gesture portion 106C, keyboard module 10 may determine new candidate strings. That is, responsive to receiving one or more motion events corresponding to gesture portion 106C, keyboard module 10 may use the sequence of motion events to determine new candidate strings as described herein. In some examples, after keyboard module 10 receives motion events that correspond to a selection of a non-character key, keyboard module 10 may determine the new candidate strings based only on gesture portions received subsequent to the selection of the non-character key. In FIG. 4B, for instance, keyboard module 10 may determine character strings "yep", "two", and "trip" based on gesture portion 106C. In other examples, keyboard module 10 may determine the new candidate strings based additionally on gesture portions 106A and/or 106A and 106B.

In the example of FIGS. 4A, 4B, keyboard module 10 may send data indicating the new candidate strings to UI module 8 for display at UI module 4. UI module 8 may receive the data from keyboard module 10 and, in response, UI module 8 may cause UI device 4 to update the displayed GUI to include the new candidate strings. For instance, UI module 8 may cause UI device 4 to display GUI 120 of FIG. 4B. In this way, computing device 2 may enable a user to select non-character keys mid-gesture and perform operations associated with non-character keys without ceasing or otherwise interrupting gesture input.

Figure 5:
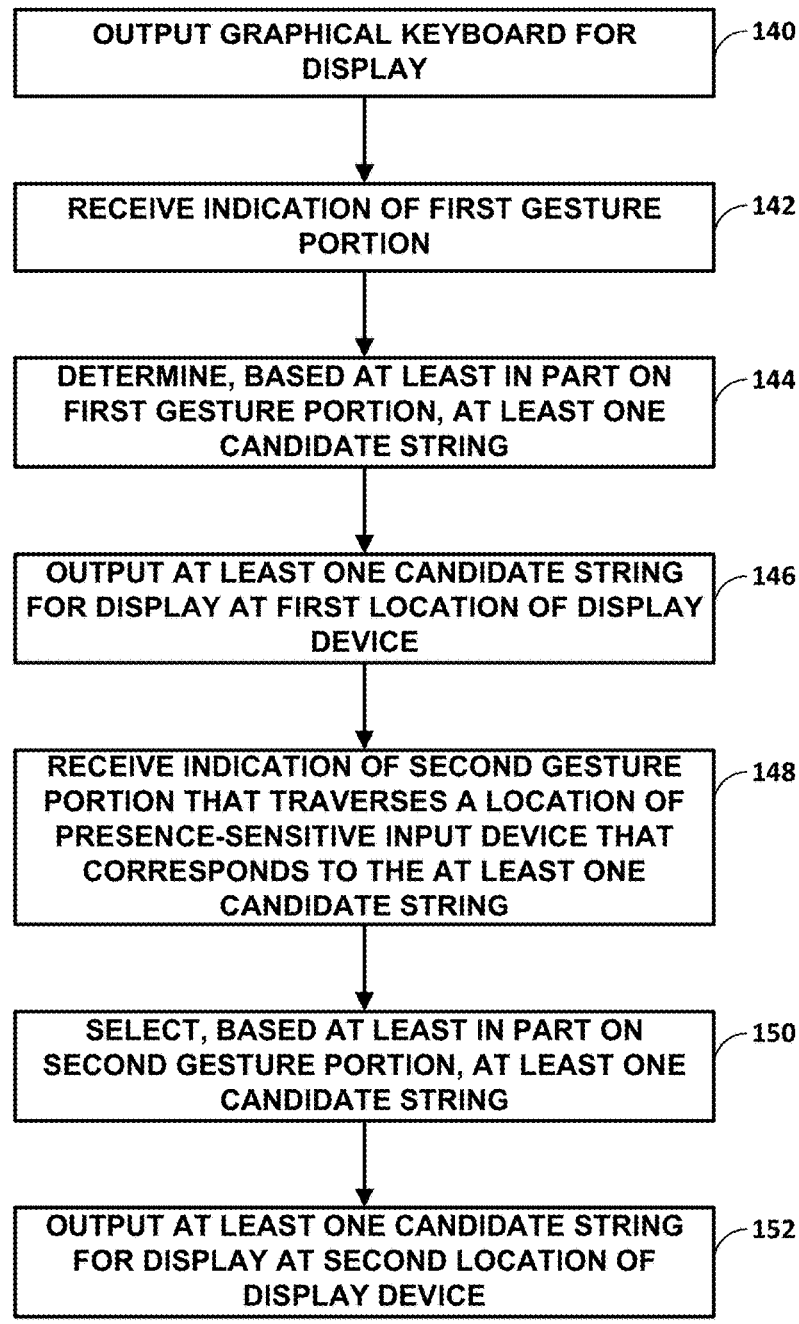
FIG. 5 is a flow diagram illustrating example operations of a computing device for enabling selection of suggestions during continuous gesture input, in accordance with one or more techniques of the present disclosure.

FIG. 5 is a flow diagram illustrating example operations of a computing device for enabling selection of suggestions during continuous gesture input, in accordance with one or more techniques of the present disclosure. For purposes of illustration only, the example operations of FIG. 5 are described below within the context of FIGS. 1 and 2.

In the example of FIG. 5, a computing device, such as computing device 2, may output, for display at a display device that is operatively coupled to the computing device, a graphical keyboard including a plurality of keys (140). Computing device 2 may receive an indication of a first gesture portion detected at a presence-sensitive input device that is operatively coupled to the computing device (142). For instance, UI module 8 of computing device 2 may receive information about a gesture being performed at UI device 4. Computing device 2 may determine, based at least in part on the first gesture portion, at least one candidate string (144). For instance, keyboard module 10 of computing device 2 may receive one or more motion events representing the first gesture portion, and incrementally determine one or more candidate strings that may represent the user's intended input.

Computing device 2, in the example of FIG. 5, may output, for display at a first location of the display device, the at least one candidate string (146). For instance, UI module 8 may cause UI device 4 to output at least one determined candidate string in a candidate string region of a displayed GUI. Computing device 2 may receive an indication of a second gesture portion that traverses a location of the presence-sensitive input device that corresponds to the at least one candidate string (148). For instance, UI module 8 may continue to receive information about the gesture being performed at UI device 4 as the gesture moves over the outputted at least one candidate string. That is, the first gesture portion and the second gesture portion may be included in a single continuous gesture.

In the example of FIG. 5, computing device 2 may select the least one candidate string based at least in part on the second gesture portion (150). For instance, keyboard module 10 may receive at least one additional motion event corresponding to the second gesture portion, determine that the gesture has traversed the at least one candidate string, and modify scores associated with one or more candidate strings, commit the selected candidate string, or perform other operations as part of selecting the at least one candidate string. Computing device 2 may output, for display at a second location of the display device, the at least one candidate string (152). That is, computing device 2 may output the selected candidate string in a different location than before, such as in an edit region of the displayed GUI. In this way, computing device 2 may enable users to select a candidate string mid-gesture. That is, a user can use a single continuous gesture to input text content and select text suggestions or non-character keys without interrupting the gesture.

Figure 6:
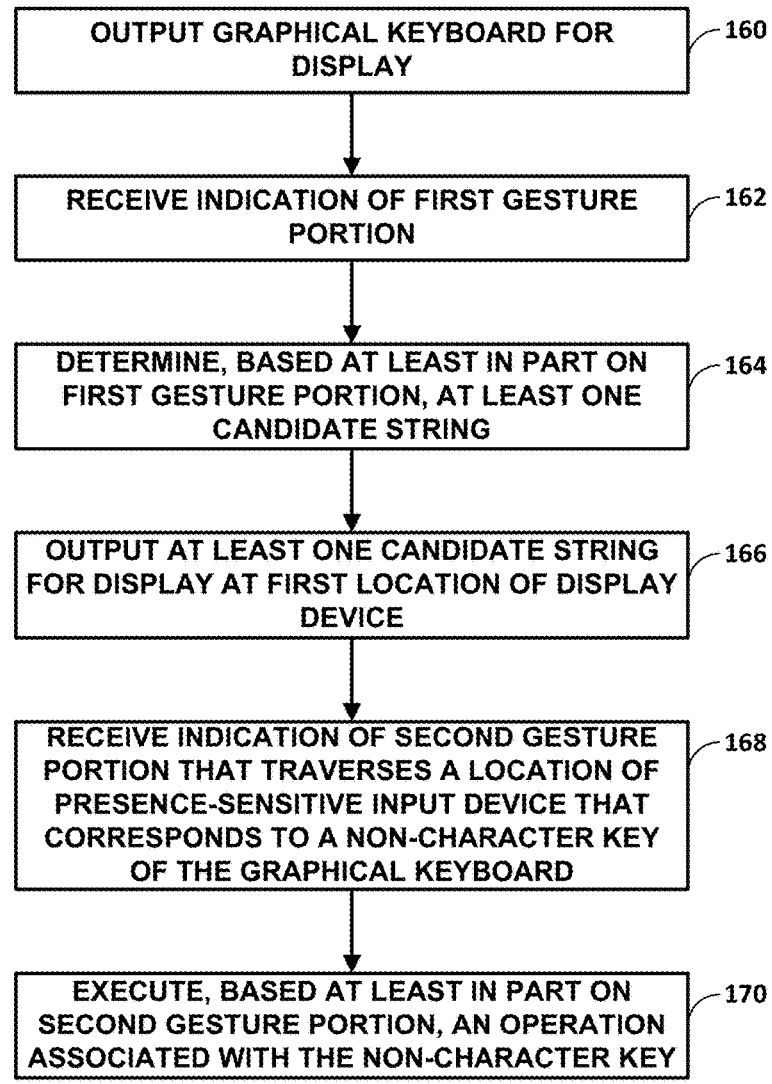
FIG. 6 is a flow diagram illustrating example operations of a computing device for enabling non-character selection during continuous gesture input, in accordance with one or more techniques of the present disclosure.

FIG. 6 is a flow diagram illustrating example operations of a computing device for enabling non-character selection during continuous gesture input, in accordance with one or more techniques of the present disclosure. For purposes of illustration only, the example operations of FIG. 6 are described below within the context of FIGS. 1 and 2.

In the example of FIG. 6, a computing device, such as computing device 2, may output, for display, a graphical keyboard including a plurality of keys (160). Computing device 2 may receive an indication of a first gesture portion detected at a presence-sensitive input device that is operatively coupled to the computing device (162). For instance, UI module 8 of computing device 2 may receive information about a gesture being performed at UI device 4. Computing device 2 may determine, based at least in part on the first gesture portion, at least one candidate string (164). For instance, keyboard module 10 of computing device 2 may receive one or more motion events representing the first gesture portion, and incrementally determine one or more candidate strings that may represent the user's intended input.

Computing device 2, in the example of FIG. 6, may output, for display at a first location of a display device that is operatively coupled to the computing device, the at least one candidate string (166). For instance, UI module 8 may cause UI device 4 to output at least one determined candidate string in a candidate string region of a displayed GUI. Computing device 2 may receive an indication of a second gesture portion that traverses a location of the presence-sensitive input device that corresponds to a non-character key of the graphical keyboard (168). For instance, UI module 8 may continue to receive information about the gesture being performed at UI device 4 as the gesture moves over the non-character key. That is, the first gesture portion and the second gesture portion may be included in a single continuous gesture.

In the example of FIG. 6, computing device 2 may execute an operation associated with the non-character key based at least in part on the second gesture portion (170). For instance, keyboard module 10 may receive at least one additional motion event corresponding to the second gesture portion, determine that the gesture has traversed the non-character key, and execute a carriage return, a deletion, enter a capital letter mode, or execute another operation. In this way, computing device 2 may enable users to select a non-character key to execute an associated operation mid-gesture. That is, a user can use a single continuous gesture to input text content and select text suggestions or non-character keys without interrupting the gesture.

The Example Operations of FIG. 5 and/or FIG. 6 may further be described by one or more of the examples below.

Example 1. A method comprising: outputting, by a computing device and for display at a display device that is operatively coupled to the computing device, a graphical keyboard comprising a plurality of keys; receiving, by the computing device, an indication of a first gesture portion detected at a presence-sensitive input device that is operatively coupled to the computing device; determining, by the computing device and based at least in part on the first gesture portion, at least one candidate string; outputting, by the computing device and for display at a first location of the display device, the at least one candidate string; receiving, by the computing device, an indication of a second gesture portion that traverses a location of the presence-sensitive input device that corresponds to the at least one candidate string, wherein the first gesture portion and the second gesture portion are included in a single continuous gesture; selecting, by the computing device and based at least in part on the second gesture portion, the at least one candidate string; and outputting, by the computing device and for display at a second location of the display device, the at least one candidate string.

Example 2. The method of example 1, wherein the at least one candidate string comprises at least one first candidate string, the method further comprising: receiving an indication of a third gesture portion detected at the presence-sensitive input device, wherein the third gesture portion is included in the single continuous gesture; determining, based at least in part on the third gesture portion, at least one second candidate string; and outputting, for display, the at least one second candidate string.

Example 3. The method of any of examples 1-2, wherein: determining the at least one candidate string comprises determining a plurality of candidate strings, the plurality of candidate strings including a first candidate string and a second candidate string that is different from the first candidate string; outputting, for display at the first location of the display device, the at least one candidate string comprises: outputting, for display at the first location of the display device, the first candidate string, and outputting, for display at the second location of the display device, the second candidate string; selecting the at least one candidate string comprises selecting the first candidate string; and outputting, for display at the second location of the display device, the at least one candidate string comprises outputting, for display at the second location of the display device, the first candidate string.

Example 4. The method of any of examples 1-3, wherein determining the at least one candidate string comprises sequentially determining the at least one candidate string based on sequential indications of the single continuous gesture, the method further comprising: sequentially determining, for each indication of the single continuous gesture, whether the single continuous gesture indicates a selection of the at least one candidate string; and responsive to determining that the single continuous gesture indicates the selection of the at least one candidate string, suspending sequential determination of the at least one candidate string.

Example 5. The method of example 4, further comprising: responsive to suspending the sequential determination of the at least one candidate string, storing subsequent indications of the single continuous gesture that are received subsequent to suspending the sequential determination of the at least one candidate string; and responsive to determining, for a particular indication from the subsequent indications of the single continuous gesture, that the single continuous gesture no longer indicates a selection of the at least one candidate string, determining at least one updated candidate string based on at least in part on the subsequent indications of the single continuous gesture.

Example 6. The method of example 5, further comprising: responsive to selecting the at least one candidate string, refraining from performing sequential determination of the at least one candidate string based on the subsequent indications of the single continuous gesture.

Example 7. The method of any of examples 4-6, wherein sequentially determining whether the single continuous gesture indicates the selection of the at least one candidate string comprises determining whether the single continuous gesture indicates the selection of the at least one candidate string based at least in part on one or more of: a location associated with the indication of the single continuous gesture, a time associated with the indication of the single continuous gesture, or an action associated with the indication of the single continuous gesture.

Example 8. The method of any of examples 4-6, wherein sequentially determining whether the single continuous gesture indicates the selection of the at least one candidate string comprises determining whether the single continuous gesture traverses a substantially straight line path toward the first location.

Example 9. The method of any of examples 1-8, further comprising: outputting, for display, an indication of a path of the first gesture portion and second gesture portion; and responsive to selecting the at least one candidate string, ceasing to output, for display, the indication of the path of the first gesture portion and second gesture portion.

Example 10. The method of any of examples 1-9, wherein each of the indication of the first gesture portion and the indication of the second gesture portion comprises a respective at least one motion event.

Example 11. A computing device, comprising: at least one processor; and at least one module operable by the at least one processor to: output, for display at a display device that is operatively coupled to the computing device, a graphical keyboard comprising a plurality of keys; receive an indication of a first gesture portion detected at a presence-sensitive input device that is operatively coupled to the computing device; determine, based at least in part on the first gesture portion, at least one candidate string; output, for display at a first location of the display device, the at least one candidate string; receive an indication of a second gesture portion that traverses the first location, wherein the first gesture portion and the second gesture portion are included in a single continuous gesture; select, based at least in part on the second gesture portion, the at least one candidate string; and output, for display at a second location of the display device, the at least one candidate string.

Example 12. The computing device of example 11, wherein the at least one candidate string comprises at least one first candidate string, and wherein the at least one module is further operable by the at least one processor to: receive an indication of a third gesture portion detected at the presence-sensitive input device, wherein the third gesture portion is included in the single continuous gesture; determine, based at least in part on the third gesture portion, at least one second candidate string; and output, for display, the at least one second candidate string.

Example 13. The computing device of any of examples 11-12, wherein: the at least one module operable to determine the at least one candidate string is operable by the at least one processor to determine a plurality of candidate strings, the plurality of candidate strings including a first candidate string and a second candidate string that is different from the first candidate string; the at least one module operable to output, for display at the first location of the display device, the at least one candidate string is operable by the at least one processor to: output, for display at the first location of the display device, the first candidate string, and output, for display at the second location of the display device, the second candidate string; the at least one module operable to select the at least one candidate string is operable by the at least one processor to select the first candidate string; and the at least one module operable to output, for display at the second location of the display device, the at least one candidate string is operable by the at least one processor to output, for display at the second location of the display device, the first candidate string.

Example 14. The computing device of any of examples 11-13, wherein the at least one module operable to determine the at least one candidate string is operable by the at least one processor to sequentially determine the at least one candidate string based on sequential indications of the single continuous gesture, and wherein the at least one module is further operable by the at least one processor to: sequentially determine, for each indication of the single continuous gesture, whether the single continuous gesture indicates a selection of the at least one candidate string; and responsive to determining that the single continuous gesture indicates the selection of the at least one candidate string, suspend sequential determination of the at least one candidate string.

Example 15. The computing device of example 14, wherein the at least one module is further operable by the at least one processor to: responsive to suspending the sequential determination of the at least one candidate string, store subsequent indications of the single continuous gesture that are received subsequent to suspending the sequential determination of the at least one candidate string; and responsive to determining, for a particular indication from the subsequent indications of the single continuous gesture, that the single continuous gesture no longer indicates a selection of the at least one candidate string, determine at least one updated candidate string based on at least in part on the subsequent indications of the single continuous gesture.

Example 16. The computing device of example 15, wherein the at least one module is further operable by the at least one processor to: responsive to selecting the at least one candidate string, discard the subsequent indications of the single continuous gesture.

Example 17. The computing device of any of examples 14-16, wherein the at least one module operable to sequentially determine whether the single continuous gesture indicates the selection of the at least one candidate string is operable by the at least one processor to determine whether the single continuous gesture indicates the selection of the at least one candidate string based at least in part on one or more of: a location associated with the indication of the single continuous gesture, a time associated with the indication of the single continuous gesture, or an action associated with the indication of the single continuous gesture.

Example 18. The computing device of any of examples 14-16, wherein the at least one module operable to sequentially determine whether the single continuous gesture indicates the selection of the at least one candidate string is operable by the at least one processor to determine whether the single continuous gesture traverses a substantially straight line path toward the first location.

Example 19. A computer-readable storage medium encoded with instructions that, when executed, cause at least one processor to: output, for display at a display device that is operatively coupled to the at least one processor, a graphical keyboard comprising a plurality of keys; receive an indication of a first gesture portion detected at a presence-sensitive input device that is operatively coupled to the at least one processor; determine, based at least in part on the first gesture portion, at least one candidate string; output, for display at a first location of the display device, the at least one candidate string; receive an indication of a second gesture portion that traverses a location of the presence-sensitive input device that corresponds to a non-character key of the graphical keyboard, wherein the first gesture portion and the second gesture portion are included in a single continuous gesture; and execute, based at least in part on the second gesture portion, an operation associated with the non-character key.

Example 20. The computer-readable storage medium of example 19, wherein the instructions that cause the at least one processor to receive the indication of the second gesture portion that traverses the location of the presence-sensitive input device that corresponds to the non-character key of the graphical keyboard comprise instructions that, when executed, cause the at least one processor to receive the indication of a second gesture portion that traverses the location of the presence-sensitive input device that corresponds to one of: a shift key, an enter key, or a delete key, and wherein the instructions that cause the at least one processor to execute the operation associated with the non-character key comprise instructions that, when executed, cause the at least one processor to: capitalize a next input character, input a carriage return, or delete at least one previously input character, respectively.

Example 21. A computing device comprising means for performing the method recited by any of claims 1-10.

Example 22. A computer-readable storage medium comprising instructions that, when executed, cause at least one processor to perform the method recited by any of claims 1-10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

Various examples have been described. These and other examples are within the scope of the following claims.

What is claimed is:

1. A method comprising:
   outputting, by a computing device and for display at a display device that is operatively coupled to the computing device, a graphical keyboard comprising a plurality of keys including character keys and non-character keys;
   after outputting the graphical keyboard for display, receiving, by the computing device, an indication of a first gesture portion of a single continuous gesture detected at a presence-sensitive input device that is operatively coupled to the computing device, wherein the first gesture portion of the single continuous gesture selects one or more of the character keys of the graphical keyboard;
   determining, by the computing device and based at least in part on the one or more character keys selected by the first gesture portion of the single continuous gesture, at least one candidate string;
   after receiving the indication of the first gesture portion, receiving, by the computing device, an indication of a second gesture portion of the single continuous gesture detected at the presence-sensitive input device, wherein the second portion of the single continuous gesture selects a particular non-character key from the non-character keys of the graphical keyboard;

executing, based at least in part on the particular non-character key selected by the second gesture portion of the single continuous gesture, an operation associated with the non-character key, wherein:

the non-character key is a shift key and the operation is capitalizing a next input character determined from a third gesture portion of the single continuous gesture that is received after the second gesture portion;

the non-character key is an enter key and the operation is inputting a carriage return prior to determining the next input character determined from the third gesture portion of the single continuous gesture that is received after the second gesture portion; or the non-character key is a delete key and the operation is deleting at least one previously input character determined from the first gesture portion of the single continuous gesture, prior to determining the next input character determined from the third gesture portion of the single continuous gesture that is received after the second gesture portion; and after executing the operation associated with the non-character key, receiving an indication of the third gesture portion of the single continuous gesture detected at the presence-sensitive input device, wherein the third gesture portion of the single continuous gesture selects at least one of the character keys of the graphical keyboard.

2. The method of claim 1, wherein the at least one candidate string comprises at least one first candidate string, the method further comprising:

determining, based at least in part on at least one of the character keys selected by the third gesture portion, at least one second candidate string; and outputting, for display, the at least one second candidate string.

3. The method of claim 2, wherein determining the at least one second candidate string comprises sequentially determining the at least one second candidate string based on sequential indications of the single continuous gesture, the method further comprising:

sequentially determining, for each indication of the single continuous gesture, whether the single continuous gesture indicates a selection of the at least one second candidate string; and responsive to determining that the single continuous gesture indicates the selection of the at least one second candidate string, suspending sequential determination of the at least one second candidate string.

4. The method of claim 3, further comprising:

responsive to suspending the sequential determination of the at least one second candidate string, storing subsequent indications of the single continuous gesture that are received subsequent to suspending the sequential determination of the at least one second candidate string; and responsive to determining, for a particular indication from the subsequent indications of the single continuous gesture, that the single continuous gesture no longer indicates a selection of the at least one second candidate string, determining at least one updated candidate string based on at least in part on the subsequent indications of the single continuous gesture.

5. The method of claim 4, further comprising:

responsive to selecting the at least one second candidate string, refraining from performing sequential determination of the at least one second candidate string based on the subsequent indications of the single continuous gesture.

6. The method of claim 3, wherein sequentially determining whether the single continuous gesture indicates the selection of the at least one second candidate string comprises determining whether the single continuous gesture indicates the selection of the at least one second candidate string based at least in part on one or more of: a location associated with the indication of the single continuous gesture, a time associated with the indication of the single continuous gesture, or an action associated with the indication of the single continuous gesture.

7. The method of claim 3, wherein sequentially determining whether the single continuous gesture indicates the selection of the at least one second candidate string comprises determining whether the single continuous gesture traverses a substantially straight line path toward a location of the display device at which the at least one second candidate string is displayed.

8. The method of claim 3, further comprising:

outputting, for display, an indication of a path of the first gesture portion and second gesture portion; and responsive to selecting the at least one second candidate string, ceasing to output, for display, the indication of the path of the first gesture portion and second gesture portion.

9. The method of claim 1, wherein each of the indication of the first gesture portion and the indication of the second gesture portion comprises a respective at least one motion event.

10. A computing device, comprising:

at least one processor; and at least one module operable by the at least one processor to:

output, for display at a display device that is operatively coupled to the computing device, a graphical keyboard comprising a plurality of keys including character keys and non-character keys;

after outputting the graphical keyboard for display, receive an indication of a first gesture portion of a single continuous gesture detected at a presence-sensitive input device that is operatively coupled to the computing device, wherein the first gesture portion of the single continuous gesture selects one or more of the character keys of the graphical keyboard;

determine, based at least in part on the one or more character keys selected by the first gesture portion, at least one candidate string;

after receiving the indication of the first gesture portion, receive an indication of a second gesture portion of the single continuous gesture detected at the presence-sensitive input device, wherein the second portion of the single continuous gesture selects a particular non-character key from the non-character keys of the graphical keyboard;

execute, based at least in part on the particular non-character key selected by the second gesture portion of the single continuous gesture, an operation associated with the non-character key, wherein:

the non-character key is a shift key and the operation is capitalizing a next input character determined from a third gesture portion of the single continuous gesture that is received after the second gesture portion;

the non-character key is an enter key and the operation is inputting a carriage return prior to determining the next input character determined from the third gesture portion of the single continuous gesture that is received after the second gesture portion; or the non-character key is a delete key and the operation is deleting at least one previously input character determined from the first gesture portion of the single continuous gesture, prior to determining the next input character determined from the third gesture portion of the single continuous gesture that is received after the second gesture portion; and after executing the operation associated with the non-character key, receive an indication of the third gesture portion of the single continuous gesture detected at the presence-sensitive input device, wherein the third gesture portion of the single continuous gesture selects at least one of the character keys of the graphical keyboard.

11. The computing device of claim 10, wherein the at least one candidate string comprises at least one first candidate string, and wherein the at least one module is further operable by the at least one processor to:

determine, based at least in part on at least one of the character keys selected by the third gesture portion, at least one second candidate string; and output, for display, the at least one second candidate string.

12. The computing device of claim 11, wherein the at least one module operable to determine the at least one second candidate string is operable by the at least one processor to sequentially determine the at least one second candidate string based on sequential indications of the single continuous gesture, and wherein the at least one module is further operable by the at least one processor to:

sequentially determine, for each indication of the single continuous gesture, whether the single continuous gesture indicates a selection of the at least one second candidate string; and responsive to determining that the single continuous gesture indicates the selection of the at least one candidate string, suspend sequential determination of the at least one second candidate string.

13. The computing device of claim 12, wherein the at least one module is further operable by the at least one processor to:

responsive to suspending the sequential determination of the at least one second candidate string, store subsequent indications of the single continuous gesture that are received subsequent to suspending the sequential determination of the at least one second candidate string; and responsive to determining, for a particular indication from the subsequent indications of the single continuous gesture, that the single continuous gesture no longer indicates a selection of the at least one second candidate string, determine at least one updated candidate string based on at least in part on the subsequent indications of the single continuous gesture.

14. The computing device of claim 13, wherein the at least one module is further operable by the at least one processor to:

responsive to selecting the at least one second candidate string, refrain from performing sequential determination of the at least one second candidate string based on the subsequent indications of the single continuous gesture.

15. The computing device of claim 12, wherein the at least one module operable to sequentially determine whether the single continuous gesture indicates the selection of the at least one second candidate string is operable by the at least one processor to determine whether the single continuous gesture indicates the selection of the at least one second candidate string based at least in part on one or more of: a location associated with the indication of the single continuous gesture, a time associated with the indication of the single continuous gesture, or an action associated with the indication of the single continuous gesture.

16. The computing device of claim 12, wherein the at least one module operable to sequentially determine whether the single continuous gesture indicates the selection of the at least one second candidate string is operable by the at least one processor to determine whether the single continuous gesture traverses a substantially straight line path toward a location of the display device at which the at least one second candidate string is displayed.

17. A non-transitory computer-readable storage medium encoded with instructions that, when executed, cause at least one processor to:

output, for display at a display device that is operatively coupled to the at least one processor, a graphical keyboard comprising a plurality of keys including character keys and non-character keys;

after outputting the graphical keyboard for display, receive an indication of a first gesture portion of a single continuous gesture detected at a presence-sensitive input device that is operatively coupled to the at least one processor, wherein the first gesture portion of the single continuous gesture selects one or more of the character keys of the graphical keyboard;

determine, based at least in part on the one or more character keys selected by the first gesture portion of the single continuous gesture, at least one candidate string;

after receiving the indication of the first gesture portion, receive an indication of a second gesture portion of the single continuous gesture detected at the presence-sensitive input device, wherein the second portion of the single continuous gesture selects a particular non-character key from the non-character keys of the graphical keyboard;

execute, based at least in part on the particular non-character key selected by the second gesture portion of the single continuous gesture, an operation associated with the non-character key, wherein:

the non-character key is a shift key and the operation is capitalizing a next input character determined from a third gesture portion of the single continuous gesture that is received after the second gesture portion;

the non-character key is an enter key and the operation is inputting a carriage return prior to determining the next input character determined from the third gesture portion of the single continuous gesture that is received after the second gesture portion; or the non-character key is a delete key and the operation is deleting at least one previously input character determined from the first gesture portion of the single continuous gesture, prior to determining the next input character determined from the third gesture portion of the single continuous gesture that is received after the second gesture portion; and after executing the operation associated with the non-character key, receive an indication of the third gesture portion of the single continuous gesture detected at the presence-sensitive input device, wherein the third gesture portion of the single continuous gesture selects at least one of the character keys of the graphical keyboard.

* * * * *